US009732217B2

(12) United States Patent
Wan et al.

(10) Patent No.: US 9,732,217 B2
(45) Date of Patent: Aug. 15, 2017

(54) POLYCARBONATE COMPOSITIONS

(75) Inventors: Shun Wan, Shanghai (CN); Dake Shen, Shanghai (CN); Yaming Niu, Shanghai (CN); Ying Xi, Shanghai (CN)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 295 days.

(21) Appl. No.: 13/593,024

(22) Filed: Aug. 23, 2012

(65) Prior Publication Data

US 2014/0058023 A1  Feb. 27, 2014

(51) Int. Cl.
*C08L 69/00* (2006.01)
*C08K 5/521* (2006.01)

(52) U.S. Cl.
CPC .................................... *C08L 69/00* (2013.01)

(58) Field of Classification Search
USPC ........................................................ 524/127
See application file for complete search history.

(56) References Cited

U.S. PATENT DOCUMENTS

| 4,154,775 | A | 5/1979 | Axelrod |
| 4,746,701 | A | 5/1988 | Kress et al. |
| 5,380,795 | A | 1/1995 | Gosens et al. |
| 5,488,086 | A | 1/1996 | Umeda et al. |
| 7,786,246 | B2 | 8/2010 | Jansen |
| 7,799,855 | B2 | 9/2010 | Ebeling et al. |
| 8,017,697 | B2 | 9/2011 | Carrillo et al. |
| 2006/0135690 | A1* | 6/2006 | Juikar et al. ............ 525/67 |
| 2009/0088514 | A1 | 4/2009 | Shiping |

FOREIGN PATENT DOCUMENTS

| GB | 2043083 A | | 10/1980 |
| WO | 2008002723 A1 | | 1/2008 |
| WO | WO 2012/058821 | * | 5/2012 |
| WO | WO 2013/067684 | * | 5/2013 |

OTHER PUBLICATIONS

"ENH2900 Polybutylene Terephthalate/Polycarbonate (PBT/PC)." SABIC Innovative Plastics Japan LLC. Pacific Grades. Component—Plastics. Underwriters Laboratories Inc, Report Date: Nov. 26, 2010.
International Search Report issued Dec. 4, 2013 by the International Searching Authority for PCT Application No. PCT/US2013/056794, filed on Aug. 22, 2013 (Applicant—SABIC Innovative Plastics IP BV // Inventor—) (4 pages).
Written Opinion of the International Searching Authority issued Dec. 4, 2013 for PCT Application No. PCT/US2013/056794, filed on Aug. 22, 2013 (Applicant—SABIC Innovative Plastics IP BV // Inventor—) (4 pages).

* cited by examiner

*Primary Examiner* — Christopher M Rodd
(74) *Attorney, Agent, or Firm* — Baker Hostetler LLP

(57) ABSTRACT

Disclosed herein are methods and compositions of blended polycarbonate resins with improved flame resistance and impact strength. The resulting compositions can be used in the manufacture of articles while still retaining the advantageous physical properties of blended polycarbonate compositions with improved flame resistance and impact strength. This abstract is intended as a scanning tool for purposes of searching in the particular art and is not intended to be limiting of the present invention.

22 Claims, No Drawings

POLYCARBONATE COMPOSITIONS

FIELD OF INVENTION

The present disclosure relates generally to polycarbonate compositions. More specifically, the present disclosure relates to improved polycarbonate compositions exhibiting at least one of increased impact strength, improved flame retardance, and improved heat resistance. Also included herein are methods for preparing the disclosed polycarbonate compositions and articles formed from such polycarbonate compositions.

BACKGROUND

Polycarbonates are synthetic thermoplastic resins that can, for example, be derived from bisphenols and phosgene, or their derivatives. Polycarbonates are a useful class of polymers having many desired properties. They are useful for forming a wide variety of products, such as by molding, extrusion, and thermoforming processes. Such products include articles and components that include auto parts, electronic appliances and cell phone components. Because of their broad use, particularly in electronic applications or visually oriented applications, such as light covers, see-through protective coverings, lenses, and transparent films, it is desirable to provide polycarbonates with improved flame resistance and impact strength while other attractive properties are retained. In particular, it is highly desired to provide polycarbonates that can exhibit improved flame resistance and impact strength for thin samples without requiring the use of halogenated flame retardant additives.

Non-halogenated flame retardants have been incorporated into polycarbonate resins for this purpose. Exemplary flame retardant agents include phosphorous acid esters, various silicate fillers and certain salts. It has been difficult, however, to meet the strictest standard of flame retardancy in thin samples with foregoing flame retardants as these flame retardant agents generally adversely affect the desirable physical properties of polycarbonate compositions, particularly in impact strength and/or heat resistance.

Thus, there remains a continuing need in the art for polycarbonate compositions that can readily produce articles with a balance of high impact strength, increased flame retardance for relatively thin samples achieved without the use of halogenated flame retardant agents.

SUMMARY OF THE INVENTION

As described in more detail herein, the present invention provides a compositions having improved flame retardance, impact strength, and heat resistance. For example in one aspect, provided are polycarbonate compositions that comprise (a) from 20 to 80 weight percent of a first polycarbonate component;

(b) from greater than 0 to 25 weight percent of a polysiloxane-polycarbonate block copolymer comprising a polycarbonate block derived from bisphenol A and a diorganopolysiloxane block of the general formula (I):

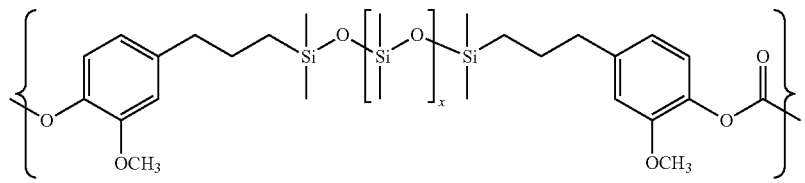

where in "x" is an integer from 40 to 60 and wherein the organopolysiloxane block is randomly distributed in a Bisphenol-A polycarbonate block copolymer such that the siloxane content within the polysiloxane-polycarbonate block copolymer is about 20% and the weight average molecular weight of the polysiloxane-polycarbonate block copolymer is from 29,000 to 31,000 daltons using Bisphenol-A polycarbonate absolute molecular weight standards;

(c) from greater than 0 to 5 weight percent of an impact modifier;

(d) from greater than 0 to 5 weight percent of anti-driping agent;

(e) from greater than 0 to 25 weight percent of a flame retardant; and.

(f) balance of one or more additional polymer composition additives;

wherein the composition exhibits a notched izod impact strength greater than 400 J/m as measured according to ASTM D256 as measured on a bar having a thickness of 3.2 mm and wherein the composition exhibits a UL-94 flammability rating of V0 as measured on a flame bar having a thickness of 0.60 mm.

In further aspects, provided are methods for the manufacture of polycarbonate compositions disclosed herein. For example, in one aspect, a method is provided for the manufacture of a polycarbonate composition that exhibits a notched izod impact strength greater than 400 J/m as measured according to ASTM D256 as measured on a bar having a thickness of 3.2 mm and wherein the composition exhibits a UL-94 flammability rating of V0 as measured on a flame bar having a thickness of 0.60 mm. The method generally comprises combining:

(a) a first polycarbonate component, wherein the first polycarbonate component is combined in an amount of from about 20 to 80 weight percent of the composition;

(b) a polysiloxane-polycarbonate block copolymer comprising a polycarbonate block derived from bisphenol A and a diorganopolysiloxane block of the general formula (I):

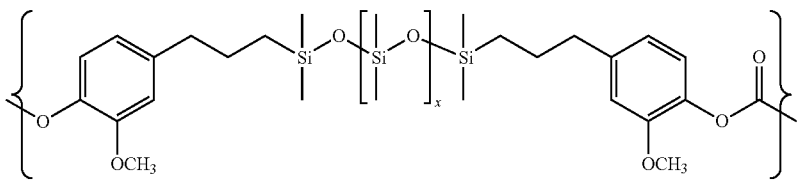

where in "x" is an integer from 40 to 60, wherein the organopolysiloxane block is randomly distributed in a Bisphenol-A polycarbonate block copolymer such that the siloxane content within the polysiloxane-polycarbonate block copolymer is about 20% and the weight average molecular weight of the polysiloxane-polycarbonate block copolymer is from 29,000 to 31,000 daltons using Bisphenol-A polycarbonate absolute molecular weight standards, and wherein the polysiloxane-polycarbonate block copolymer is combined in an amount from greater than 0 to 25 weight percent of the composition;
(c) an impact modifier, wherein the impact modifier is combined in an amount of from greater than 0 to 5 weight percent of the composition;
(d) an anti-driping agent, wherein the anti-driping agent is combined in an amount from greater than 0 to 5 weight percent of the composition;
(e) a flame retardant, wherein the flame retardant is combined in an amount from greater than 0 to 25 weight percent of the composition; and
(f) a balance amount of one or more additional polymer composition additives.

In still further aspects, articles of manufacture are provided comprising the disclosed polycarbonate compositions as well as polycarbonate compositions and articles of manufacture produced by the processes disclosed herein.

In various aspects, the disclosed polycarbonate compositions exhibit at least one of improved flame retardance, increased impact strength, or improved heat resistance as characterized by an improved heat deflection temperature. For example, according to aspects, the disclosed composition exhibit a notched izod impact strength greater than 400 J/m as measured according to ASTM D256 as measured on a bar having a thickness of 3.2 mm and a UL-94 flammability rating of V0 as measured on a flame bar having a thickness of 0.60 mm.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a polycarbonate" includes mixtures of two or more polycarbonates.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms 'optional' or 'optionally' means that the subsequently described event or circumstance can or can not occur, and that the description includes instances where said event or circumstance occurs and instances where it does not. For example, the phrase "optionally substituted alkyl" means that the alkyl group can or can not be substituted and that the description includes both substituted and unsubstituted alkyl groups.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% weight, it is understood that this percentage is relation to a total compositional percentage of 100%.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulphur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "ether" as used herein is represented by the formula AOA¹, where A and A¹ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "sulfo-oxo group" as used herein is represented by the formulas $-S(O)_2R$, $-OS(O)_2R$, or, $-OS(O)_2OR$, where R can be hydrogen, an alkyl, alkenyl, alkynyl, aryl, aralkyl, cycloalkyl, halogenated alkyl, or heterocycloalkyl group described above.

The term "PPPBP" as used herein refers to a compound having a structure represented by the formula:

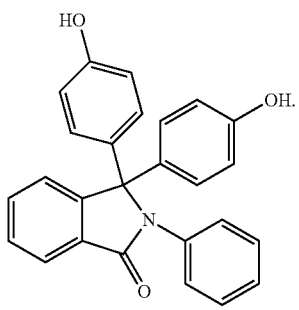 [SMILES: O=C1c2ccccc2C(c2ccc(O)cc2)(c2ccc(O)cc2)N1c1ccccc1]

PPPBP can also be referred to by the following names: 2-Phenyl-3,3-bis(4-hydroxyphenyl)phthalimidine; N-Phenyl-3,3-bis(4-hydroxyphenyl)phthalimidine; 3,3-bis(4-hydroxyphenyl)-2-phenylisoindolin-1-one; 3,3-bis(4-hydroxyphenyl)-2-phenyl-2,3-dihydro-1H-isoindol-1-one. PPPBP has the CAS #6607-41-6.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Polycarbonate Compositions

The disclosed polycarbonate compositions generally comprise a first polycarbonate component, a second a polysiloxane-polycarbonate block copolymer component, an impact modifier, a anti-driping agent, and a flame retardant. The polycarbonate compositions can further optionally comprise a balance amount of one or more additives. Still further, the polycarbonate composition can also optionally comprise a third high heat polycarbonate polymer, such as, for example, a polycarbonate comprising repeat units of a 3,3-bis(4-hydroxyphenyl)-2-phenylisoindolin-1-one (PPPBP), also referred to herein as a PPPBP containing polycarbonate (PPPBP-PC). Preferably, the disclosed compositions can be further characterized by exhibiting less than 1000 ppm of a bromine- and/or chlorine-containing compound, including for example exhibiting less than 900 ppm, less than 800 ppm, less than 700 ppm, less than 600 ppm, or even less than 500 ppm of a bromine- and/or chlorine-containing compound.

As briefly summarized above, the disclosed polycarbonate compositions exhibit at least one of improved flame retardance, increased impact strength, or improved heat resistance. For example, according to aspects, the disclosed composition exhibit a notched izod impact strength greater than 400 J/m as measured according to ASTM D256 as measured on a bar having a thickness of 3.2 mm and a UL-94 flammability rating of V0 as measured on a flame bar having a thickness of 0.60 mm. In a still further aspect, the composition exhibits a notched Izod impact strength of greater than about 600 J/m, measured according to ASTM D256 at 0° C. on a bar having a thickness of 3.2 mm. In a yet further aspect, the composition exhibits a UL-94 flammability rating of V0 measured at a thickness of 0.60 mm. In an even further aspect, the composition exhibits a heat deflection temperature greater than about 105° C.

In an exemplary and non-limiting aspect, a disclosed polycarbonate composition comprises:
(a) from 20 to 80 weight percent of a first polycarbonate component;
(b) from greater than 0 to 25 weight percent of a polysiloxane-polycarbonate block copolymer comprising polycarbonate blocks derived from Bisphenol-A and diorganopolysiloxane blocks of the general formula (I):

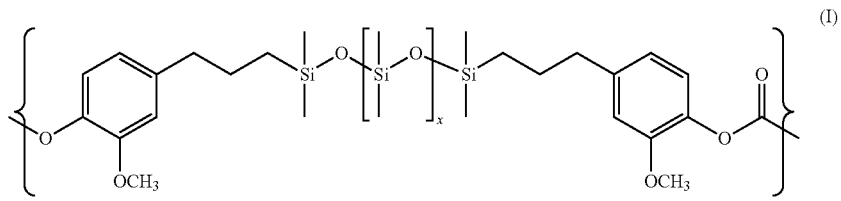

where in "x" is an integer from 40 to 60 and wherein the organopolysiloxane block is randomly distributed in a Bisphenol-A polycarbonate block copolymer such that the siloxane content within the polysiloxane-polycarbonate block copolymer is about 20% and the weight average molecular weight of the polysiloxane-polycarbonate block copolymer is from 29,000 to 31,000 daltons using Bisphenol-A polycarbonate absolute molecular weight standards.
(c) from greater than 0 to 5 weight percent of an impact modifier;
(d) from greater than 0 to 5 weight percent of anti-driping agent;
(e) from greater than 0 to 25 weight percent of a flame retardant; and.
(f) a balance of one or more additional polymer composition additives;

wherein the composition exhibits a notched izod impact strength greater than 400 J/m as measured according to ASTM D256 as measured on a bar having a thickness of 3.2 mm and wherein the composition exhibits a UL-94 flammability rating of V0 as measured on a flame bar having a thickness of 0.60 mm.

In a further exemplary and non-limiting aspect, a disclosed polycarbonate composition comprises:

(a) from 20 to 80 weight percent of a first polycarbonate component;
(b) from 10 to 25 weight percent of a polysiloxane-polycarbonate block copolymer comprising polycarbonate blocks derived from Bisphenol-A and diorganopolysiloxane blocks of the general formula (I):

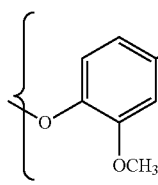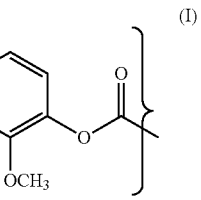

(I)

where in "x" is an integer from 40 to 60 and wherein the organopolysiloxane block is randomly distributed in a Bisphenol-A polycarbonate block copolymer such that the siloxane content within the polysiloxane-polycarbonate block copolymer is about 20% and the weight average molecular weight of the polysiloxane-polycarbonate block copolymer is from 29,000 to 31,000 daltons using Bisphenol-A polycarbonate absolute molecular weight standards;
(c) from greater than 0 to 5 weight percent of an MBS impact modifier;
(d) from greater than 0 to 25 weight percent of a bisphenol A diphenylphosphate flame retardant;
(e) from greater than 0 to 5 weight percent of anti-driping agent; and.
(f) balance of one or more additional polymer composition additives;
wherein the composition exhibits a notched izod impact strength greater than 400 J/m as measured according to ASTM D256 as measured on a bar having a thickness of 3.2 mm and wherein the composition exhibits a UL-94 flammability rating of V0 as measured on a flame bar having a thickness of 0.60 mm.

In one aspect, the blended polymer compositions disclosed herein possess increased heat deflection temperature relative to polycarbonate polymer blends without the PPPBP polymer. For example, a similarly prepared blended polymer composition with a PPPBP-BPA copolymer has an increased heat deflection temperature of about 7° C. higher when compared to a similar blended polycarbonate composition that does not have a PPPBP-BPA copolymer. In one aspect, disclosed herein are blended polycarbonate compositions having an increased heat deflection temperature relative to a blended polycarbonate compositions without a PPPBP-BPA polymer. In a further aspect, disclosed are blended polycarbonate compositions comprising PPPBP-BPA having a heat deflection temperature of at least about 105, 106, 107, 108, 109, 110, 111, 112, 113, 114, 115, 116.

In one aspect, the blended polymer compositions disclosed herein possess increased impact strength and flame retardance relative to polycarbonate polymer blends without the polysiloxane-polycarbonate polymer. For example, a similarly prepared blended polymer composition with a the polysiloxane-polycarbonate polymer has an notched izod impact of about 137 J/m higher (at 0° C. and 3.2 mm thickness) when compared to a similar blended polycarbonate composition that does not have a polysiloxane-polycarbonate polymer. In one aspect, disclosed herein are blended polycarbonate compositions having an increased impact strength relative to a blended polycarbonate compositions without a polysiloxane-polycarbonate polymer. In a further aspect, disclosed are blended polycarbonate compositions comprising a polysiloxane-polycarbonate polymer having a impact strength of at least about 400, 500, 600, 700, 800, 900 J/m (at 0° C. and 3.2 mm thickness). In a still further aspect, the disclosed polycarbonate compositions comprising a polysiloxane-polycarbonate polymer have a impact strength of at least about 400, 500, 600, 700, 800, 900 J/m, (at −10° C. and 3.2 mm thickness).

First Polycarbonate Component

As summarized above, the disclosed polycarbonate compositions comprise a first polycarbonate component. In one aspect, the first polycarbonate can comprise any polycarbonate material or mixture of materials, for example, as recited in U.S. Pat. No. 7,786,246, which is hereby incorporated in its entirety for the specific purpose of disclosing various polycarbonate compositions and methods. The first polycarbonate component can comprise homopolycarbonates and/or copolycarbonates derived from one dihydroxy monomer or a combination of two or more dihydroxy aromatic monomers, respectively. To that end, as used herein the term "polycarbonate" and "polycarbonate resin" means compositions having repeating structural carbonate units of the formula (I):

(I)

in which at least about 60% of the total number of $R^1$ groups are aromatic organic groups and the balance thereof are aliphatic, alicyclic, or aromatic groups. In one aspect, each R1 is an aromatic organic group, for example a group of the formula (II):

-$A^1$-$Y^1$-$A^2$- (II)

wherein each of $A^1$ and $A^2$ is a monocyclic divalent aryl group and $Y^1$ is a bridging group having one or two atoms that separate $A^1$ from $A^2$. For example, one atom may separate $A^1$ from $A^2$, with illustrative examples of these groups including —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ may be a hydrocarbon group or a saturated hydrocarbon group such as methylene, cyclohexylidene, or isopropylidene.

The polycarbonates may be produced from dihydroxy compounds having the formula HO—$R^1$—OH, wherein $R^1$ is defined as above for formula (I). The formula HO—$R^1$—OH includes bisphenol compounds of formula (III):

HO-$A^1$-$Y^1$-$A^2$-OH (III)

wherein $Y^1$, $A^1$ and $A^2$ are as described above. Included are bisphenol compounds of general formula (IV):

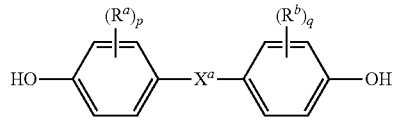
(IV)

wherein $R^a$ and $R^b$ each represent a halogen atom or a monovalent hydrocarbon group and may be the same or different; p and q are each independently integers of 0 to 4; and $X^a$ represents one of the groups of formula (V):

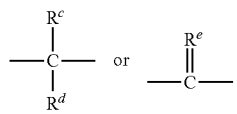
(V)

wherein $R^c$ and $R^d$ each independently represent a hydrogen atom or a monovalent linear alkyl or cyclic alkylene group and $R^e$ is a divalent hydrocarbon group. In one aspect, $R^c$ and $R^d$ represent a cyclic alkylene group; or a heteroatom-containing cyclic alkylene group comprising carbon atoms and heteroatoms with a valency of two or greater. In still a further aspect, a heteroatom-containing cyclic alkylene group comprises at least one heteroatom with a valency of 2 or greater, and at least two carbon atoms. Suitable heteroatoms for use in the heteroatom-containing cyclic alkylene group include —O—, —S—, and —N(Z)—, where Z is a substituent group selected from hydrogen, $C_{1-12}$ alkyl, $C_{1-12}$ alkoxy, or $C_{1-12}$ acyl. Where present, the cyclic alkylene group or heteroatom-containing cyclic alkylene group may have 3 to 20 atoms, and may be a single saturated or unsaturated ring, or fused polycyclic ring system wherein the fused rings are saturated, unsaturated, or aromatic.

Other bisphenols containing substituted or unsubstituted cyclohexane units may be used, for example, bisphenol of formula (VI):

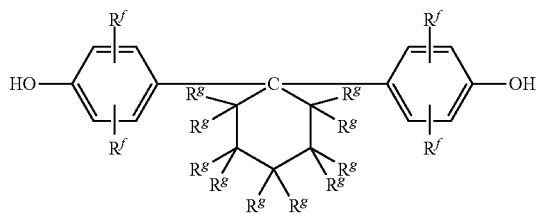
(VI)

wherein each $R^f$ is independently hydrogen, $C_{1-12}$ alkyl, or halogen; and each $R^g$ is independently hydrogen or $C_{1-12}$ alkyl. The substituents may be aliphatic or aromatic, straight-chain, cyclic, bicyclic, branched, saturated, or unsaturated.

Other useful dihydroxy compounds having the formula HO—$R^1$—OH include aromatic dihydroxy compounds of formula (VII):

(VII)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine, though it is not limited to only bromine.

Some exemplary dihydroxy compounds include: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that may be represented by formula (3) include 1,1-bis(4-hydroxyphenyl) methane, 1,1-bis(4-hydroxyphenyl)ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxy-t-butylphenyl) propane, and 1,1-bis(4-hydroxy-3-methylphenyl)cyclohexane (DMBPC). Combinations comprising at least one of the foregoing dihydroxy compounds may also be used.

In yet a further aspect, polycarbonates with branching groups can be useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4-(4'-(1,1-bis(p-hydroxyphenyl)-ethyl) alpha, alpha-dimethylbenzyl) phenol), 4-chloroformyl phthalic anhydride, trimesic acid, and benzophenone tetracarboxylic acid. In one aspect, a branching agent can be added at a level of about 0.05 to about 2.0 wt %. In still another aspect, mixtures comprising linear polycarbonates and branched polycarbonates can be used.

The first polycarbonate may be a copolymer comprising different R1 moieties in the carbonate. For example, polycarbonates, including isosorbide-based polyester-polycarbonate, can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate. Such copolymers further contain carbonate units derived from oligomeric ester-containing dihydroxy compounds (also referred to herein as hydroxy end-capped oligomeric acrylate esters).

A specific type of copolymer can be a polyester carbonate, also known as a polyester-polycarbonate. Such copolymers further contain, in addition to recurring carbonate chain units of the formula (I) as described above, repeating units of formula (VIII):

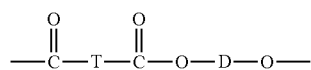
(VIII)

wherein O-D-O is a divalent group derived from a dihydroxy compound, and D may be, for example, one or more alkyl containing $C_6$-$C_{20}$ aromatic group(s), or one or more $C_6$-$C_{20}$ aromatic group(s), a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T divalent group derived from a dicarboxylic acid, and may be, for example, a $C_{2-10}$ alkylene group, a $C_{6-20}$ alicyclic group, a $C_{6-20}$ alkyl aromatic group, or a $C_{6-20}$ aromatic group.

In one aspect, D may be a $C_{2-30}$ alkylene group having a straight chain, branched chain, or cyclic (including polycyclic) structure. In another aspect, O-D-O may be derived from an aromatic dihydroxy compound of formula (3) above. In another aspect, O-D-O may be derived from an aromatic dihydroxy compound of formula (4) above. In another aspect, O-D-O may be derived from an aromatic dihydroxy compound of formula (VII) above.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids may be terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another aspect, D may be a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers may vary broadly, for example 1:99 to 99:1, specifically 10:90 to 90:10, more specifically 25:75 to 75:25, depending on the desired properties of the final composition.

In a specific aspect, the polyester unit of a polyester-polycarbonate may be derived from the reaction of a combination of isophthalic and terephthalic diacids (or derivatives thereof) with resorcinol. In another aspect, the polyester unit of a polyester-polycarbonate may be derived from the reaction of a combination of isophthalic acid and terephthalic acid with bisphenol-A. In an aspect, the polycarbonate units may be derived from bisphenol A. In another specific aspect, the polycarbonate units may be derived from resorcinol and bisphenol A in a molar ratio of resorcinol carbonate units to bisphenol A carbonate units of 1:99 to 99:1.

Useful polyesters may include aromatic polyesters, poly(alkylene esters) including poly(alkylene arylates), and poly(cycloalkylene diesters). Aromatic polyesters may have a polyester structure according to formula (12), wherein D and T are each aromatic groups as described hereinabove. In an aspect, useful aromatic polyesters may include, for example, poly(isophthalate-terephthalate-resorcinol) esters, poly(isophthalate-terephthalate-bisphenol-A) esters, poly[(isophthalate-terephthalate-resorcinol) ester-co-(isophthalate-terephthalate-bisphenol-A)]ester, or a combination comprising at least one of these.

The first polycarbonate component can be present in the disclosed compositions in any desired weight percentage amount relative to the total weight percentage of the polycarbonate composition. For example, the first polycarbonate polymer component can be present in an amount from greater than 0 weight % to about 85 wt. %, including exemplary amounts of 5 weight %, 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, and 80 weight %. In still further aspects, the first polycarbonate component can be present in any range of amounts derived from the above exemplified amounts. For example, the first polycarbonate component can be present in an amount in the range of from 20 weight % to 80 weight %, from 30 weight % to 80 weight %, or even from 50 weight % to 80 weight %. The first polycarbonate component can comprise any one or more polycarbonate polymers described above. For example, the first polycarbonate polymer component can comprise a bisphenol A polycarbonate homopolymer. In still a further aspect, the first polycarbonate polymer component can comprise a blend of two or more polycarbonates.

Polysiloxane-Polycarbonate Copolymer

The disclosed polycarbonate compositions further comprise a second polycarbonate component. The second polycarbonate is a polycarbonate polysiloxane copolymer. The polycarbonate polysiloxane copolymer has a polysiloxane structural unit and a polycarbonate structural unit. The polycarbonate structural unit of the polycarbonate polysiloxane copolymer may be derived from carbonate units of formula (I) as described above. The carbonate units may be derived from one or more dihydroxy monomers of formula (III) including bisphenol compound of formula (IV), both as described and incorporated herein from above. The dihydroxy compound may be bisphenol-A.

The polysiloxane structural unit may be derived from a siloxane-containing dihydroxy compounds (also referred to herein as "hydroxyaryl end-capped polysiloxanes") that contain diorganosiloxane unit blocks of formula (IX):

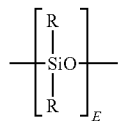

(IX)

wherein each occurrence of R is same or different, and is a $C_{1-13}$ monovalent organic group. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. The foregoing groups can be fully or partially halogenated with fluorine, chlorine, bromine, or iodine, or a combination thereof. In an aspect, where a transparent polycarbonate is desired, R does not contain any halogen. Combinations of the foregoing R groups can be used in the same polycarbonate.

The value of E in formula (IX) can vary widely depending on the type and relative amount of each of the different units in the polycarbonate, the desired properties of the polycarbonate, and like considerations. Generally, E can have an average value of about 2 to about 1,000, specifically about 2 to about 500, more specifically about 2 to about 100. In an aspect, E has an average value of about 4 to about 90, specifically about 5 to about 80, and more specifically about 40 to about 60.

In one aspect, the polysiloxane blocks are provided by repeating structural units of formula (X):

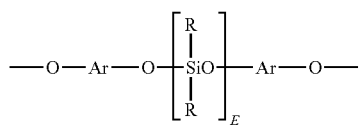

(X)

wherein E is as defined above; each R is the same or different, and is as defined above; and each Ar is the same or different, and Ar is one or more $C_6$-$C_{30}$ aromatic group(s), or one or more alkyl containing $C_6$-$C_{30}$ aromatic group(s), wherein the bonds are directly connected to an aromatic moiety. The —O—Ar—O— groups in formula (X) can be, for example, a $C_6$-$C_{30}$ dihydroxyaromatic compound. Combinations comprising at least one of the foregoing dihydroxyaromatic compounds can also be used. Exemplary dihydroxyaromatic compounds are 1,1-bis(4-hydroxyphenyl) methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, 2,2-bis(4-hydroxy-1-methylphenyl)propane, 1,1-bis(4-hydroxyphenyl) cyclohexane, bis(4-hydroxyphenyl sulfide), 1,1-bis(4-hydroxy-3-methylphenyl)cyclohexane, and 1,1-bis(4-hydroxy-t-butylphenyl)propane, or a combination comprising at least one of the foregoing dihydroxy compounds.

Polycarbonates comprising such units can be derived from the corresponding dihydroxy compound of formula (XI):

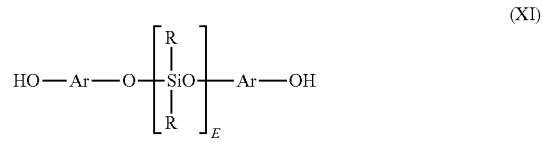

(XI)

wherein Ar and E are as described above. Compounds of formula (XI) can be obtained by the reaction of a dihydroxyaromatic compound with, for example, an alpha, omega-bis-acetoxy-polydiorganosiloxane oligomer under phase transfer conditions. Compounds of formula (XI) can also be obtained from the condensation product of a dihydroxyaromatic compound, with, for example, an alpha, omega bis-chloro-polydimethylsiloxane oligomer in the presence of an acid scavenger.

In another aspect, polydiorganosiloxane blocks can comprise units of formula (XII):

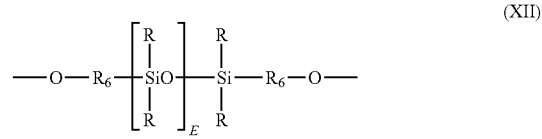

(XII)

wherein R and E are as described above, and each $R_6$ is independently a divalent $C_1$-$C_{30}$ organic group such as a $C_1$-$C_{30}$ alkyl, $C_1$-$C_{30}$ aryl or $C_1$-$C_{30}$ alkylaryl. The polysiloxane blocks corresponding to formula (XII) are derived from the corresponding dihydroxy compound of formula (XIII):

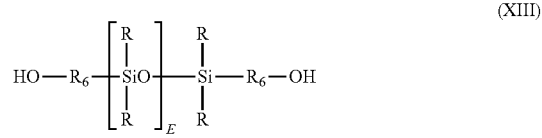

(XIII)

wherein R and E and $R_6$ are as described for formula (XII) above.

In another aspect, the polydiorganosiloxane blocks are provided by repeating structural units of formula (XIV):

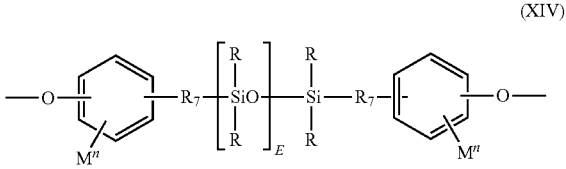

(XIV)

wherein R and E are as defined above. $R_7$ in formula (XIV) is a divalent $C_2$-$C_8$ aliphatic group. Each M in formula (XIV) can be the same or different, and is a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In one aspect, M of formula (XIV) is bromo or chloro, an alkyl group such as methyl, ethyl, or propyl, an alkoxy group such as methoxy, ethoxy, or propoxy, or an aryl group such as phenyl, chlorophenyl, or tolyl, n=0 to 4; $R_7$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another aspect, R is methyl, or a combination of methyl and trifluoropropyl, or a combination of methyl and phenyl. In still another aspect, M is methoxy, n is one, $R_7$ is a divalent $C_1$-$C_3$ aliphatic group, and R is methyl.

Polysiloxane-polycarbonates comprising units of formula (XIV) can be derived from the corresponding dihydroxy polydiorganosiloxane of formula (XV):

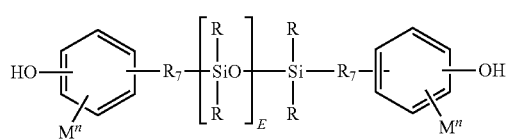

(XV)

wherein each of R, E, M, $R_7$, and n are as described above. Such dihydroxy polysiloxanes can be made by effecting a platinum-catalyzed addition between a siloxane hydride of formula (XVI):

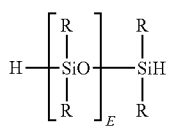

(XVI)

wherein R and E are as previously defined, and an aliphatically unsaturated monohydric phenol. Exemplary aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, 4-allylphenol, and 2-allyl-4,6-dimethylphenol. Combinations comprising at least one of the foregoing can also be used.

In still a further aspect, the polysiloxane polycarbonate copolymer can be a block copolymer of polycarbonate and eugenol capped polydimethylsilioxane (PDMS) having the general structure (XVII) as shown below:

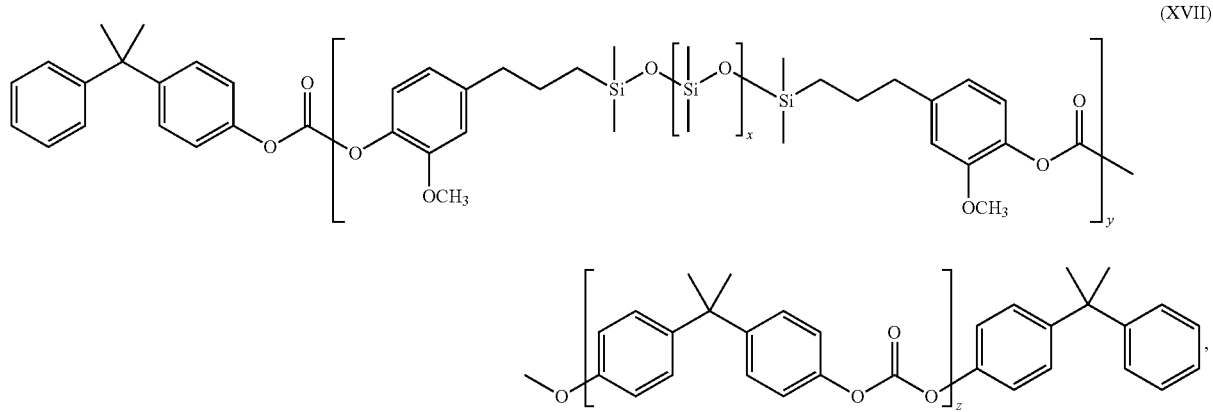

(XVII)

wherein the polysiloxane-polycarbonate block copolymer comprises polycarbonate blocks derived from Bisphenol-A and diorganopolysiloxane blocks of the general formula (XVIII):

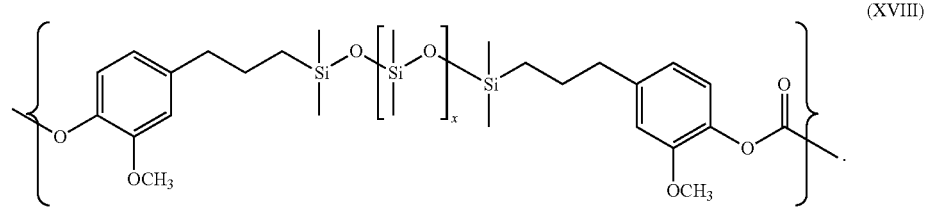

(XVIII)

According to exemplary aspects, the polysiloxane block length "X" of formula (XVIII) is from about 40 to about 60. Still further, the diorganopolysiloxane blocks of formula (XVIII) are randomly distributed in the polysiloxane-polycarbonate block copolymer of formula (XVII) such that the siloxane content of the polysiloxane-polycarbonate block copolymer is about 20 wt %. Still further, the weight average molecular weight of the polysiloxane-polycarbonate block copolymer of formula (XVII) can be from about 29 kDa to about 31 kDa when determined using bisphenol-A polycarbonate absolute molecular weight standards. As describe above, the polysiloxane-polycarbonate block copolymer can optionally be end-capped with p-cumyl-phenol.

Diorganopolysiloxane blocks of formula (XVIII) can be derived from the corresponding dihydroxy compound of formula (XIX):

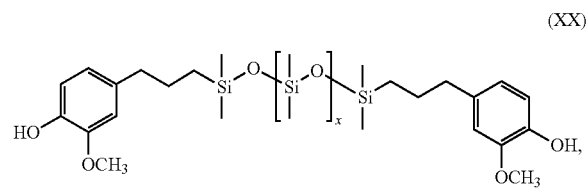

(XX)

wherein x is as described above. Compounds of this type and others are further described in U.S. Pat. No. 4,746,701 to Kress, et al and U.S. Pat. No. 8,017,0697 to Carrillo. Compounds of this formula can, for example, be obtained by the reaction of the appropriate dihydroxyarylene compound with, for example, an alpha, omega-bisacetoxypolydiorangonosiloxane under phase transfer conditions.

The polycarbonate-polysiloxane copolymer may be manufactured by reaction of a dihydroxy polysiloxane with a carbonate source and a dihydroxy aromatic compound such as bisphenol-A, optionally in the presence of a phase transfer catalyst as described above. Suitable conditions are similar to those useful in forming polycarbonates as described above. For example, the copolymers are prepared by phosgenation, at temperatures from below 0° C. to about 100° C., preferably about 25° C. to about 50° C. Since the reaction is exothermic, the rate of phosgene addition may be used to control the reaction temperature. The amount of phosgene required will generally depend upon the amount of the dihydric reactants. Alternatively, the polycarbonate-polysiloxane copolymers may be prepared by co-reacting in a molten state, the dihydroxy monomers and a diaryl carbonate ester, such as diphenyl carbonate, in the presence of a transesterification catalyst as described above.

In the production of the polycarbonate-polysiloxane copolymer, the amount of dihydroxy diorganopolysiloxane is selected so as to provide the desired amount of diorganopolysiloxane units in the copolymer. The particular amounts used will therefore be determined depending on desired physical properties of the composition, the value of x (within the range of about 40 to about 60), and the type and relative amount of each component in the composition, including the type and amount of polycarbonate, type and amount of impact modifier, type and amount of polycarbonate-polysiloxane copolymer, and type and amount of any other additives. Suitable amounts of dihydroxy diorganopolysiloxane can be determined by one of ordinary skill in the art without undue experimentation using the guidelines taught herein. For example, the amount of dihydroxy polydiorganosiloxane may be selected so as to produce a copolymer comprising about 20 wt. % polydimethylsiloxane. In one aspect, the copolymer may comprise about 20 wt. % siloxane.

The polysiloxane-polycarbonate copolymer component can be present in the disclosed compositions in any desired weight percentage amount relative to the total weight percentage of the polycarbonate composition. For example, the first polycarbonate polymer component can be present in an amount from greater than 0 weight % to about 25 wt. %, including exemplary amounts of 5 weight %, 10 weight %, 15 weight %, and 20 weight %. In still further aspects, the polysiloxane-polycarbonate copolymer component can be present in any range of amounts derived from the above exemplified amounts. For example, the first polycarbonate component can be present in an amount in the range of from 10 weight % to 25 weight %, from 5 weight % to 20 weight %, or even from 5 weight % to 15 weight %.

Optional High Heat Polycarbonate Component

The disclosed polycarbonate compositions can further comprise an optional third polycarbonate component comprising a high heat (XHT) polycarbonate material. The optional high heat polycarbonate can advantageously increase the heat resistance of the disclosed polycarbonate compositions as reflected by measurement of the heat deflection temperatures.

An exemplary high heat polycarbonate can be derived from dihydroxy compounds of general formula (III) as described above further having the following formula (XXI):

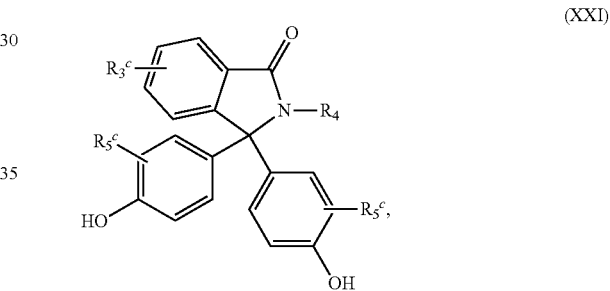

(XXI)

wherein $R_3$ and $R_5$ are each independently a halogen or a $C_{1-6}$ alkyl group, $R_4$ is a $C_{1-6}$ alkyl, phenyl, or phenyl substituted with up to five halogens or $C_{1-6}$ alkyl groups, and c is 0 to 4. In a specific aspect, $R_4$ is a $C_{1-6}$ alkyl or phenyl group. In still another aspect, $R_4$ is a methyl or phenyl group. In another specific aspect, each c is 0.

In as specific exemplary aspect, a highheat polycarbonate can be derived from a dihydroxy compound of the following formula (XXII):

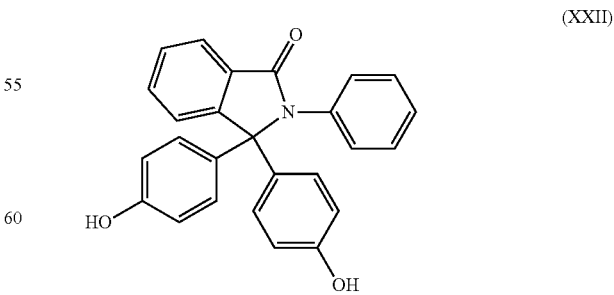

(XXII)

(also known as 3,3-bis(4-hydroxyphenyl)-2-phenylisoindolin-1-one (PPPBP)). The term "PPPBP-PC" refers to a polycarbonate copolymer comprising repeating carbonate units derived from PPPBP and at least one other dihydroxy monomer such as a bisphenol A. For example, PPPBP-PC can be a polycarbonate copolymer comprising PPPBP and bisphenol A monomer units.

The term "PPPBP" as used herein refers to a compound having a structure represented by the formula:

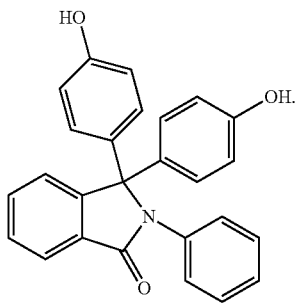 [SMILES: O=C1c2ccccc2C(c2ccc(O)cc2)(c2ccc(O)cc2)N1c1ccccc1]

PPPBP can also be referred to by the following names: 2-Phenyl-3,3-bis(4-hydroxyphenyl)phthalimidine; N-Phenyl-3,3-bis(4-hydroxyphenyl)phthalimidine; 3,3-bis(4-hydroxyphenyl)-2-phenylisoindolin-1-one; 3,3-bis(4-hydroxyphenyl)-2-phenyl-2,3-dihydro-1H-isoindol-1-one. PPPBP has the CAS #6607-41-6.

In one aspect, the polymer compositions disclosed herein possess increased heat deflection temperature relative to a reference polycarbonate composition in the absence of the high heat polycarbonate (PPPBP-PC) copolymer. For example, a similarly prepared blended polymer composition with a PPPBP-BPA copolymer can exhibit an increased heat deflection temperature of at least about 7° C. higher when compared to a similar blended polycarbonate composition that does not have a PPPBP-BPA copolymer. In one aspect, disclosed herein are blended polycarbonate compositions having an increased heat deflection temperature relative to a blended polycarbonate compositions without a PPPBP-BPA polymer. In a further aspect, disclosed are blended polycarbonate compositions comprising PPPBP-BPA having a heat deflection temperature of at least about 105, 106, 107, 108, 109, 110, 111, 112, 113, 114, 115, 116.

The optional high heat polycarbonate polymer, when used, can be present in an amount from greater than 0 weight % to about 30 weight %, including exemplary amounts of 5 weight %, 10 weight %, 15 weight %, 20 weight %, and 25 weight %. In a still further aspect, the high heat polycarbonate component can be present in an amount within any range of derived from the above values, including for example, an amount of from about 10 weight % to about 20 weight %.

Methods of Making Polycarbonates

The polycarbonates disclosed and described above can be manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions of, for example, from about 8 to about 10.

The polycarbonate compounds and polymers disclosed herein can, in various aspects, be prepared by a melt polymerization process. Generally, in the melt polymerization process, polycarbonates are prepared by co-reacting, in a molten state, the dihydroxy reactant(s) (i.e., isosorbide, aliphatic diol and/or aliphatic diacid, and any additional dihydroxy compound) and a diaryl carbonate ester, such as diphenyl carbonate, or more specifically in an aspect, an activated carbonate such as bis(methyl salicyl)carbonate, in the presence of a transesterification catalyst. The reaction can be carried out in typical polymerization equipment, such as one or more continuously stirred reactors (CSTRs), plug flow reactors, wire wetting fall polymerizers, free fall polymerizers, wiped film polymerizers, BANBURY® mixers, single or twin screw extruders, or combinations of the foregoing. In one aspect, volatile monohydric phenol can be removed from the molten reactants by distillation and the polymer is isolated as a molten residue.

The melt polymerization can include a transesterification catalyst comprising a first catalyst, also referred to herein as an alpha catalyst, comprising a metal cation and an anion. In an aspect, the cation is an alkali or alkaline earth metal comprising Li, Na, K, Cs, Rb, Mg, Ca, Ba, Sr, or a combination comprising at least one of the foregoing. The anion is hydroxide ($OH^-$), superoxide ($O^{2-}$), thiolate ($HS^-$), sulfide ($S^{2-}$), a $C_{1-20}$ alkoxide, a $C_{6-20}$ aryloxide, a $C_{1-20}$ carboxylate, a phosphate including biphosphate, a $C_{1-20}$ phosphonate, a sulfate including bisulfate, sulfites including bisulfites and metabisulfites, a $C_{1-20}$ sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyelenediaminetetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediaminetetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst comprising an alkali or alkaline earth salt. In an exemplary aspect, the transesterification catalyst comprising sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be about 0.001 to about 500 μmol. In an aspect, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization.

In another aspect, a second transesterification catalyst, also referred to herein as a beta catalyst, can optionally be included in the melt polymerization process, provided that the inclusion of such a second transesterification catalyst does not significantly adversely affect the desirable properties of the polycarbonate. Exemplary transesterification catalysts can further include a combination of a phase transfer catalyst of formula $(R^3)_4Q^+X$ above, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalyst salts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_{1-8}$ alkoxy group or a $C_{6-18}$ aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In one aspect, an end-capping agent (also referred to as a chain-stopper) can optionally be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned.

In another aspect, endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In one aspect, the endgroup of a polycarbonate, including an polycarbonate polymer as defined herein, can comprise a structural unit derived from a diaryl carbonate, where the structural unit can be an endgroup. In a further aspect, the endgroup is derived from an activated carbonate. Such endgroups can be derived from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups.

In one aspect, the melt polymerization reaction can be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature can be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction can then be increased to about 250° C. and then optionally further increased to a temperature of about 320° C., and all subranges there between. In one aspect, the total reaction time can be from about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

In one aspect, the progress of the reaction can be monitored by measuring the melt viscosity or the weight average molecular weight of the reaction mixture using techniques known in the art such as gel permeation chromatography. These properties can be measured by taking discrete samples or can be measured on-line. After the desired melt viscosity and/or molecular weight is reached, the final polycarbonate product can be isolated from the reactor in a solid or molten form. It will be appreciated by a person skilled in the art, that the method of making aliphatic homopolycarbonate and aliphatic-aromatic copolycarbonates as described in the preceding sections can be made in a batch or a continuous process and the process disclosed herein is preferably carried out in a solvent free mode. Reactors chosen should ideally be self-cleaning and should minimize any "hot spots." However, vented extruders similar to those that are commercially available can be used.

Polycarbonates with branching groups are also contemplated as being useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

Impact Modifier

The disclosed polycarbonate compositions further comprise an impact modifier component comprising one or more suitable impact modifiers. Suitable impact modifiers can include, for example, relatively high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. In another aspect, a combination of any two or more individual impact modifiers can be used. In a yet further aspect, the impact modifier can be emulsion polymerized.

An exemplary type of impact modifier suitable for use in the disclosed compositions is an elastomer-modified graft copolymer comprising an elastomeric (i.e., rubbery) polymer substrate having a $T_g$ less than about 10° C., less than about −10° C., or about −40° C. to −80° C., and a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_{1-6}$ esters of acrylic acid and methacrylic acid, specifically poly methyl methacrylate (PMMA) and polystyrene acrylonitrile (SAN).

Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), methyl methacrylate-butadiene (MB) and styrene-acrylonitrile (SAN). Such impact modifiers are generally commercially available, and one of skill in the art, in possession of this disclosure, could readily select an appropriate impact modifier without requiring undue experimentation.

According to some aspects, the impact modifier comprises a methacrylate-butadiene-styrene (MBS) polymer composition. The MBS polymer composition can be an emulsion polymerized MBS or, alternatively, the MBS polymer composition can be a bulk polymerized MBS. In an even further aspect, the MBS polymer composition may be derived from the monomers selected from styrene, butadiene, or methylmethacrylate. In a still further aspect, the MBS polymer can be characterized by a butadiene content of from about 20% to about 85%. In a yet further aspect, the butadiene content of the MBS polymer is from about 30% to about 65%. In an even further aspect, the butadiene content of the MBS polymer is from about 40% to about 55%. In a still further aspect, the butadiene content of the MBS polymer is from about 10% to about 25%. In a yet further aspect, the methylmethacrylate content of the MBS polymer is from about 5% to about 25%. In an even further aspect, the methylmethacrylate content of the MBS polymer is from about 7% to about 17%.

Exemplary commercially available impact modifiers that are suitable for use in the disclosed compositions include: (1) Paraloid EXL2650A methyl methacrylate butadiene styrene core-shore copolymer available from Rohm and Haas Trading Co., Ltd; (2) HR181 acrylonitrile-butadiene-styrene co-polymer available from Kumho Petrochemical; (3) KD1101 stryene-butadiene block copolymer available from Kraton Polymers GmBh; and (4) Metablen-S2001 methy methacrylate core shell copolymer with butyl acrylate rubber and dimethylsiloxane as the core, available from Mitsubishi Corp. (HK) Ltd.

The impact modifier component can be present in the disclosed polycarbonate compositions in an amount of from greater than 0 weight % to 5 weight %, including exemplary amounts of 0.1 weight %, 0.5 weight %, 1 weight %, 1.5 weight %, 2 weight %, 2.5 weight %, 3 weight %, 3.5 weight %, 4.0 weight %, and 4.5 weight %. In still further aspects, the impact modifier component can be present in any range of amounts derived from the above exemplified amounts. For example, the impact modifier can be present in an amount in the range of from 0.5 weight % to 5 weight % or 0.5 weight % to 2.5 weight %. In still further aspects, it should be appreciated that the impact modifier component can comprise two or more suitable impact modifiers as described herein.

Anti-Driping Agent Additive

The disclosed polycarbonate compositions further comprise a anti-driping agent (also referred to herein as an anti-drip agent). For example a fibril forming or non-fibril forming fluoropolymer such as polytetrafluoroethylene (PTFE) can be used. The anti-drip agent may be encapsulated by a rigid copolymer, for example styrene-acrylonitrile (SAN). PTFE encapsulated in SAN is known as TSAN. Encapsulated fluoropolymers may be made by polymerizing the encapsulating polymer in the presence of the fluoropolymer, for example, in an aqueous dispersion. TSAN may provide significant advantages over PTFE, in that TSAN may be more readily dispersed in the composition. A suitable TSAN may comprise, for example, about 50 wt % PTFE and about 50 wt % SAN, based on the total weight of the encapsulated fluoropolymer. The SAN may comprise, for example, about 75 wt % styrene and about 25 wt % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer.

The anti-driping agent is present in an amount from greater than 0 weight % to about 5 weight %, including exemplary amounts of about 0.5 weight %, about 1.0 weight %, about 1.5 weight %, about 2.0 weight %, about 2.5 weight %, about 3.0 weight %, about 3.5 weight %, about 4.0 weight %, and about 4.5 weight %. In still further aspects, the anti-driping agent can be present in any range of amounts derived from the above exemplified amounts. For example, the anti-driping agent can be present in an amount in the range of from 0.5 weight % to 5 weight %, or from 0.5 weight % to 2.5 weight %.

Flame Retardant Additive

The disclosed polycarbonate compositions further comprises a flame retardant additive. In various aspects, the flame retardant additive can comprise any flame retardant material or mixture of flame retardant materials suitable for use in the inventive composition. In another aspect, the flame retardant additive comprises a phosphate containing material. In various further aspects, the disclosed polycarbonate compositions comprise a phosphorus-containing flame retardant, for example an organic phosphates and/or an organic compound containing phosphorus-nitrogen bonds. In another aspect, the flame retardant additive comprises a halogen containing material. In other aspects, the flame retardant additive is free of or substantially free of one or more of phosphate and/or a halogen. In various aspects, the flame retardant additive is selected from oligomeric phosphate, polymeric phosphate, aromatic polyphosphate, oligomeric phosphonate, or mixed phosphate/phosphonate ester flame retardant compositions. In a still further aspect, the flame retardant is selected from oligomeric phosphate, polymeric phosphate, oligomeric phosphonate, or mixed phosphate/phosphonate ester flame retardant compositions.

In a further aspect, the flame retardant additive is bisphenol-A bis(diphenyl phosphate). In an even further aspect, the flame retardant additive is resorcinol diphenyl phosphate ("RDP"). In a still further aspect, the flame retardant additive is resorcinol aromatic polyphosphate (CAS#139189-30-3). The resorcinol aromatic polyphosphate assigned CAS#139189-30-3 is commercially available under the tradename PX200 (Daiichi Chemical Industry Co., Ltd.). In still another aspect, the flame retardant additive comprises an oligomer organophosphorous flame retardant, including for example, bisphenol A diphenyl phosphate (BPADP). In a yet further aspect, the flame retardant additive is selected from bisphenol A diphenyl phosphate ("BPADP"), resorcinol diphenyl phosphate ("RDP"), triphenyl phosphate; cresyldiphenylphosphate; and tri(isopropylphenyl)phosphate. In an even further aspect, the flame retardant additive is selected from bisphenol A diphenyl phosphate ("BPADP") and resorcinol diphenyl phosphate ("RDP"). In a still further aspect, the flame retardant additive is selected from bisphenol A diphenyl phosphate ("BPADP"), resorcinol diphenyl phosphate ("RDP"), and resorcinol aromatic polyphosphate (CAS#139189-30-3).

The phosphorus-containing flame retardant of the disclosed polycarbonate compositions can be an organic phosphate and/or an organic compound containing phosphorus-nitrogen bonds. One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl) phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

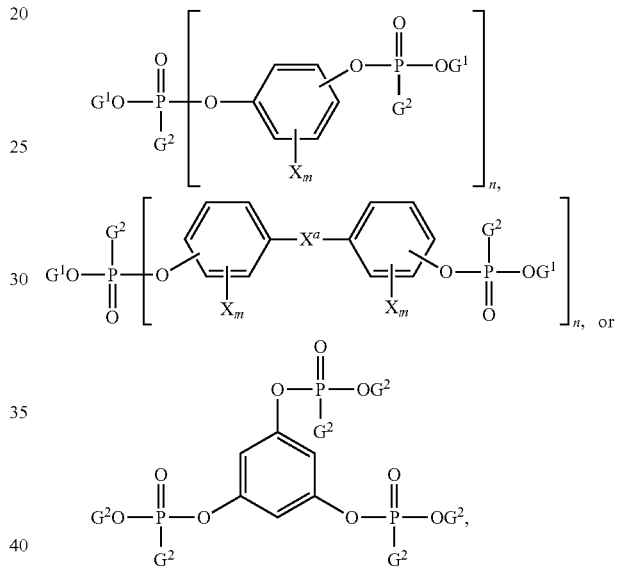

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m 0 to 4, and n is 1 to about 30. Examples of suitable di- or polyfunctional aromatic phosphorus-containing compounds include resorcinol tetraphenyl diphosphate (RDP), the bis (diphenyl)phosphate of hydroquinone and the bis(diphenyl) phosphate of bisphenol-A, respectively, their oligomeric and polymeric counterparts, and the like. Methods for the preparation of the aforementioned di- or polyfunctional aromatic compounds are described in British Patent No. 2,043,083.

Additional flame retardants may be added as desired. Suitable flame retardants that may be added may be organic compounds that include phosphorus, bromine, and/or chlorine. Non-brominated and non-chlorinated phosphorus-containing flame retardants may be desired in certain applications for regulatory reasons, for example organic phosphates and organic compounds containing phosphorus-nitrogen bonds.

Exemplary flame retardants may include: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene.

The concentration of a flame retardant additive can vary, and the present invention is not intended to be limited to any particular flame retardant concentration. In one aspect, the disclosed composition comprises from about 5 weight % to about 20 wt. % of flame retardant additive, including or example, about 6, 7, 8, 9, 10, 11, 12, 13, 14, 15, 16, 17, 18, or 19 weight %. In still further aspects, the flame retardant additive can be present in any range of amounts derived from the above values. For example, the flame retardant additive can be present in the polycarbonate composition in an amount in the range of from about 5 weight % to about 15 weight %, or event from about 10 weight percent to about 20 weight %. Flame retardant additives are commercially available, and one of skill in the art could readily select an appropriate flame retardant additive.

Other Additives for Polycarbonate Compositions

In addition to the foregoing components, the disclosed polycarbonate compositions can optionally comprise a balance amount of one or more additive materials ordinarily incorporated in polycarbonate resin compositions of this type, with the proviso that the additives are selected so as to not significantly adversely affect the desired properties of the polycarbonate composition. Combinations of additives can be used. Such additives can be mixed at a suitable time during the mixing of the components for forming the composition. Exemplary and non-limiting examples of additive materials that can be present in the disclosed polycarbonate compositions include an antioxidant, a stabilizer (including for example a heat stabilizer or a light stabilizer), UV absorbing additive, plasticizer, lubricant, mold release agent, antistatic agent, colorant (e.g., pigment and/or dye), filler, reinforcing component, or any combination thereof.

In a further aspect, the disclosed polycarbonate compositions comprise an antioxidant additive. In various further aspects, the antioxidant additive can comprise a primary antioxidant or "stabilizer" (e.g., a hindered phenol and/or secondary aryl amine) and, optionally, a secondary antioxidant (e.g., a phosphate and/or thioester). According to various aspects, the antioxidant can be a primary antioxidant. For example, a primary antioxidant can be present in an amount of from about 0.001 weight % to about 0.5 weight %. In a still further aspect, the primary antioxidant can be selected from hindered phenols, phosphites, phosphonates, and any mixture thereof. In a yet further aspect, the primary antioxidant is a hindered phenol. In an even further aspect, the primary antioxidant is tetrakis(methylene(3,5di-tert-butyl-4-hydroxy-hydrocinnamate)methane.

In a further aspect, the disclosed polycarbonate composition can further comprise a secondary antioxidant in an amount from about 0.001 weight % to about 0.500 weight %. In a still further aspect, the secondary antioxidant can be a thioester or thioether. In a yet further aspect, the secondary antioxidant is selected from pentaerythritol tetrakis(3-(dodecylthio)propionate), pentaerythritoltetrakis[3-(3,5-di-tert-butyl-4-hydroxyphenyl)propionate], dilauryl thiodipropionate, distearyl thiodipropionate, dimyristyl thiodipropionate, ditridecyl thiodipropionate, pentaerythritol octylthiopropionate, and dioctadecyl disulphide. In an even further aspect, the secondary antioxidant is pentaerythritol tetrakis(3-(dodecylthio)propionate).

Suitable antioxidant additives include, for example, organophosphites such as tris(nonyl phenyl)phosphite, tris(2,4-di-t-butylphenyl)phosphite, bis(2,4-di-t-butylphenyl) pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants.

In another aspect, the inventive polycarbonate composition can comprise a filler, such as, for example, an inorganic filler. The specific composition of a filler, if present, can vary, provided that the filler is chemically compatible with the remaining components of the polycarbonate composition. In one aspect, the polycarbonate composition comprises a filler, such as, for example, talc. If present, the amount of filler can comprise any amount suitable for a polycarbonate composition that does not adversely affect the desired properties thereof. In one aspect, the inventive polycarbonate comprises about 1 wt. % to about 10 wt. % of a filler.

In another aspect, a filler can comprise silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

In one aspect, a filler, if present, can be coated with a layer of metallic material to facilitate conductivity, or surface treated with silanes to improve adhesion and dispersion with the polymeric matrix resin. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

In a still further aspect, the disclosed polycarbonate compositions comprise a lubricant (also referred to herein as a mold release agent). Any commercially available lubricant suitable for use in polycarbonate compositions can be used. According to aspects, the lubricant can be selected from methyl stearate; stearyl stearate, and pentaerythritol tetrastearate. In a still further aspect, the lubricant is pentaerythritol tetrastearate.

Articles of Manufacture

The disclosed polycarbonate compositions can be used in the manufacture of various end use articles. The polycarbonate compositions can be formed into useful shaped articles by a variety of means such as; injection molding, extrusion, rotational molding, compression molding, blow molding, sheet or film extrusion, profile extrusion, gas assist molding, structural foam molding and thermoforming. The blended polycarbonate compositions described herein resins can also be made into film and sheet as well as components of laminate systems.

Formed articles include, for example, computer and business machine housings, home appliances, trays, plates, handles, helmets, automotive parts such as instrument panels, cup holders, glove boxes, interior coverings and the like. In various further aspects, formed articles include, but are not limited to, food service items, medical devices, animal cages, electrical connectors, enclosures for electrical equipment, electric motor parts, power distribution equipment, communication equipment, computers and the like, including devices that have molded in snap fit connectors. In a further aspect, articles of the present invention comprise exterior body panels and parts for outdoor vehicles and devices including automobiles, protected graphics such as signs, outdoor enclosures such as telecommunication and electrical connection boxes, and construction applications such as roof sections, wall panels and glazing. Multilayer articles made of the disclosed polycarbonates particularly include articles which will be exposed to UV-light, whether natural or artificial, during their lifetimes, and most particularly outdoor articles; i.e., those intended for outdoor use. Suitable articles are exemplified by enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; facsimile machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

In one aspect, the present invention pertains to articles comprising the disclosed blended polycarbonate compositions. In a further aspect, the article comprising the disclosed blended polycarbonate compositions is used in automotive applications. In a still further aspect, the article used in automotive applications is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards. In a yet further aspect, the article used in automotive applications is selected from seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers. In an even further aspect, the article used in automotive applications is selected from seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers. In an even further aspect, article is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, running boards, seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers.

In various aspects, the invention relates to articles comprising a disclosed composition. In a further aspect, the article is used in electrical and electronic applications. In a still further aspect, the article is selected from components for cell phones and cell phone covers, components for batteries, components for computer housings, computer housings and business machine housings such as housings for monitors, handheld electronic device housings such as housings for cell phones, electrical connectors, and components of lighting fixtures, ornaments, home appliances, roofs, greenhouses, sun rooms, swimming pool enclosures, Light Emitting Diodes (LEDs) and light panels, extruded film and sheet articles, and the like. In a yet further aspect, the compositions are of particular utility in the manufacture of thin walled articles such as housings for electronic devices. In a still further aspect, additional examples of articles that can be formed from the compositions include electrical parts, such as relays, batteries, capacitors, and enclosures, consumer electronics such as enclosures and parts for laptops, desktops, docking stations, PDAs, digital cameras, desktops, and telecommunications parts such as parts for base station terminals.

Methods of Manufacture

The disclosed polycarbonate compositions of the present invention can be manufactured by various methods. The compositions of the present invention can be blended with the aforementioned ingredients by a variety of methods involving intimate admixing of the materials with any additional additives desired in the formulation. Because of the availability of melt blending equipment in commercial polymer processing facilities, melt processing methods can be used. In various further aspects, the equipment used in such melt processing methods includes, but is not limited to, the following: co-rotating and counter-rotating extruders, single screw extruders, co-kneaders, disc-pack processors and various other types of extrusion equipment. In a further aspect, the extruder is a twin-screw extruder. In various further aspects, the melt processed composition exits processing equipment such as an extruder through small exit holes in a die. The resulting strands of molten resin are cooled by passing the strands through a water bath. The cooled strands can be chopped into small pellets for packaging and further handling.

The temperature of the melt is minimized in order to avoid excessive degradation of the resins. For example, it can be desirable to maintain the melt temperature between about 230° C. and about 350° C. in the molten resin composition, although higher temperatures can be used provided that the residence time of the resin in the processing equipment is kept short. In a still further aspect, the extruder is typically operated at a temperature of about 180° C. to about 385° C. In a yet further aspect, the extruder is typically operated at a temperature of about 200° C. to about 330° C. In an even further aspect, the extruder is typically operated at a temperature of about 220° C. to about 300° C.

In various aspects, the polycarbonate compositions of the present invention can be prepared by blending the first polycarbonate polymer, the second polycarbonate polymer, the impact modifier, the anti-driping agent, the flame retardant, and any polymer composition additive, e.g. a HENSCHEL-Mixer® high speed mixer or other suitable mixer/blender. Other low shear processes, including but not limited to hand mixing, can also accomplish this blending. The mixture can then be fed into the throat of a single or twin screw extruder via a hopper. Alternatively, at least one of the components can be incorporated into the composition by feeding directly into the extruder at the throat and/or downstream through a sidestuffer. Additives can also be compounded into a masterbatch desired polymeric resin and fed into the extruder. The extruder generally operated at a temperature higher than that necessary to cause the composition to flow. The extrudate is immediately quenched in a water bath and pelletized. The pellets, so prepared, when cutting the extrudate can be one-fourth inch long or less as desired. Such pellets can be used for subsequent molding, shaping, or forming.

Without further elaboration, it is believed that one skilled in the art can, using the description herein, utilize the present invention. The following examples are included to provide addition guidance to those skilled in the art of practicing the claimed invention. The examples provided are merely representative of the work and contribute to the teaching of the present invention. Accordingly, these examples are not intended to limit the invention in any manner.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

The component materials used to prepare both the comparative and representative inventive compositions evaluated in the following examples are shown in Table 1 below.

TABLE 1

| Acronym/Name | Chemical Name (Use) | Trade Name/Source | CAS # |
|---|---|---|---|
| PC 1 | POLYCARBONATE RESIN (29.9K MW) | LEXAN* 105-111N Resin POWDER (MFI 5.5-7.5) 30 g/10 min @ 1.2 Kg/300 C. SABIC INNOVATIVE PLASTICS MT VERNON IN USA | 111211-39-3 |
| PC 2 | POLYCARBONATE RESIN (21.9K MW) | LEXAN* ML5221-111N Resin Powder (MFI 20-30 g/10 min @ 1.2 Kg/300 C. SABIC INNOVATIVE PLASTICS MT VERNON IN USA | 111211-39-3 |
| High Heat PC copolymer (XHT) | Polycarbonate Resin, reaction product of N-phenylphenol phthaleinylbisphenol, 2,2-bis(4-hydroxyphenyl)propane and phosgene(25K MW) | Not commercially available | 503834-43-3 |
| Polysiloxane Polycarboante EXL-PC | Organopolysiloxane-polycarbonate block copolymer wherein the siloxane block length is 40 to 60 repeat units and is randomly distributed in a Bisphenol-A polycarbonate block copolymer such that the siloxane content is nominally 20% and the weight average molecular weight is 29,000 to 31,000 daltons using Bisphenol-A polycarbonate absolute molecular weight standards | Not commercially available. | 202483-49-6 |
| Impact Modifier 1 (IM 1) | METHYLMETHACRYLATE BUTADIENE SHELL-CORE COPOLYMER | PARALOID EXL2650A.ROHM AND HAAS TRADING CO., LTD | 01-01-7 |
| Impact Modifier 2 (IM 2) | ACRYLONITRILE-BUTADIENE-STYRENE CO-POLYMER | HR181/KUMHO PETROCHEMICAL | 9003-56-9 |
| Impact Modifier 3 (IM 3) | STYRENE-BUTADIENE BLOCK COPOLYMER | KD1101/KRATON POLYMERS GMBH | 9003-55-8 |
| Impact Modifier 4 (IM 4) | Methyl methacrylate polymer with butyl acrylate and dimethylsiloxane | METABLEN S-2001/MITSUBISHI CORP (HK) LTD | 143106-82-5 |
| Flame Retardant 1 (FR 1) | BPA DIPHOSPHATE | CR741/DIAHACHI FOR SHANGHAI | 5945-33-5 |
| Flame Retardant 2 (FR 2) | RDP, RESORCINOL DIPHOSPHATE | YOKE RDP/JIANGSU YOKE TECHNOLOGY CO., LTD | 57583-54-7 |
| Flame Retardant 3 (FR 3) | OLIGOMERIC AROMATIC PHOSPHATE | PX-200/DIAHACHI FOR SHANGHAI | 139189-30-3 |
| Anti-driping agent (TSAN) | POLY(TETRAFLUOROETHYLENE):STYRENE-ACRYLONITRILE 50:50 | SABIC INNOVATIVE PLASTICS Ottawa IL USA | 9002-84-0 |
| Antioxidant (AO) | OCTADECYL3(3,5DITERTBUTYL4HYDROXYPHENYL)PROPIONATE | IRGANOX 1076/CIBA SPECIALITY COMPANY CORPORATION | 2082-79-3 |
| LUBRICANT | PENTAERYTHRITOL TETRASTEARATE | PENTAERYTHRITOL TETRASTEARATE/FACI ASIA PACIFIC PTE LTD | 115-83-3 |
| Phosphite Stabilizer (PS) | TRIS(2,4-DI-T-BUTYLPHENYL)PHOSPHITE | IRGAFOS 168/CIBA ADDITIVES BENELUX | 31570-04-4 |

Using the above component materials, comparative and inventive compositions were prepared according to the formulations shown in Tables 2, 3 and 4. Representative (experimental) examples of the present invention are designated by letter E (E1 through E52), comparative (control) examples are designated by letter C(C1 through C16). Sample batches of approximately 40 pounds for each composition were prepared by pre-blending all constituents in a dry-blend and tumble mixed for 20 minutes. The pre-blend was fed directly to a co-rotation twin screw extruder (37 mm) operated under standard processing conditions well known to one skilled in the art. The organic phosphorus flame retardant component (BPA-DP and RDP) was added to the middle part of the extruder from a liquid feed pump. The composition was then melt-kneaded and extruded. The extrudate was cooled through a water bath prior to pelletizing. The obtained pellets were then dried at 100° C. for 4 hours. All the testing of specimens were prepared in accordance with ASTM standards using a 150 T injection molding machine at a melt temperature 265° C. and at mold temperature 80° C. except that bar specimens measuring 127 mm×12 mm×0.60 mm were molded 35° C. higher that the rest.

TABLE 2

| | C1 | C2 | C3 | C4 | C5 | C6 | C7 | C8 | C9 | C10 | C11 | C12 |
|---|---|---|---|---|---|---|---|---|---|---|---|---|
| Component | | | | | | | | | | | | |
| PC 1 | | 33.12 | 35.02 | 33.12 | 33.12 | | | | | | 41.23 | 42.02 |
| PC 2 | 66.24 | 33.12 | 35.02 | 33.12 | 33.12 | 82.45 | 80.59 | 82.45 | 81.72 | 82.45 | 41.23 | 42.02 |
| High Heat PC | | | | | | | | | | | | |
| EXL-PC | 21.8 | 21.8 | 18 | 21.8 | 21.8 | | | | | | | |
| Impact Modifier 1 (IM 1) | | | | | | 5.59 | | | | | 5.59 | 4 |
| Impact Modifier 2 (IM 2) | | | | | | | 7.45 | 5.59 | | | | |
| Impact Modifier 3 (IM 3) | | | | | | | | | 6.32 | | | |
| Impact Modifier 4 (IM 4) | | | | | | | | | | 5.59 | | |
| Total Rubber content*$^a$, % | 4.36 | 4.36 | 3.60 | 4.36 | 4.36 | 4.36 | 4.36 | 3.27 | 4.36 | 4.36 | 4.36 | 3.12 |
| Flame Retardant 1 (FR 1) | 10.5 | 10.5 | 10.5 | | | 10.5 | 10.5 | 10.5 | 10.5 | 10.5 | 10.5 | 10.5 |
| Flame Retardant 2 (FR 2) | | | | 11 | | | | | | | | |
| Flame Retardant 3 (FR 3) | | | | | 10.5 | | | | | | | |
| Properties | | | | | | | | | | | | |
| MFR@260 C. 2.16 Kg g/10 min | 19.9 | 10.9 | 11.5 | 11.6 | 12.7 | 24.7 | 19.5 | 22.6 | 29.4 | 23.4 | 11.6 | 12.1 |
| HDT@0.45 Mp-3.2 mm | 98 | 101 | 101 | 100 | 91 | 98 | 98 | 99 | 97.8 | 98.9 | 101 | 101 |
| Vicat Soften Temp B/120 | 108 | 109 | 109 | 111 | 102 | 107 | 108 | 109 | 105 | 107 | 109 | 110 |
| INI@ 23 C. (J/m) | 473 | 754 | 85.2 | 184 | 74 | 493 | 596 | 107 | 74 | 676 | 691 | 591 |
| INI@10 C. (J/m) | 82 | NA | NA | 89 | 70 | 115 | 370 | 104 | 75 | 149 | NA | NA |
| INI@0 C. (J/m) | 83 | 189 | 82 | 91 | 69 | 114 | 137 | 89 | 69 | 121 | 566 | 110 |
| INI@ −10 C. (J/m) | NA | 96 | 85 | 73 | 68 | NA | NA | NA | NA | NA | 145 | 100 |
| UL 94 Rating (0.6 mm) | V0 | V0 | V0 | V0 | V0 | NV*$^b$ | NV | NV | NV | NV | NV | NV |
| FOT-5 parts, s 23 C.-48 hours | 27 | 27 | 22 | 29.5 | 18.1 | 77 | 142.7 | 94.3 | 171 | 83.1 | 63 | 67 |
| FOT-5 parts, s 70 C.-168 hours | 23.3 | 21.5 | 15.4 | 19.2 | 13.7 | 67.6 | 114.9 | 67.3 | 169 | 34.2 | 25.1 | 25.8 |

| | C13 | C14 | C15 | E1 | E2 | E3 | E4 | E5 | E6 | E7 | E8 | E9 |
|---|---|---|---|---|---|---|---|---|---|---|---|---|
| Component | | | | | | | | | | | | |
| PC 1 | 41.02 | 41.23 | 41.23 | | | | | | | 33.85 | 34.57 | 35.3 |
| PC 2 | 41.02 | 41.23 | 41.23 | 67.69 | 69.14 | 70.59 | 72.04 | 74.94 | 77.84 | 33.85 | 34.57 | 35.3 |
| High Heat PC | | | | | | | | | | | | |
| EXL-PC | | | | 19.85 | 17.9 | 15.95 | 14 | 10.1 | 6.2 | 19.85 | 17.9 | 15.95 |
| Impact Modifier 1 (IM 1) | 4 | 5.59 | 5.59 | 0.5 | 1 | 1.5 | 2 | 3 | 4 | 0.5 | 1 | 1.5 |
| Impact Modifier 2 (IM 2) | | | | | | | | | | | | |
| Impact Modifier 3 (IM 3) | | | | | | | | | | | | |
| Impact Modifier 4 (IM 4) | | | | | | | | | | | | |
| Total Rubber content*$^a$, % | 3.12 | 4.36 | 4.36 | 4.36 | 4.36 | 4.36 | 4.36 | 4.36 | 4.36 | 4.36 | 4.36 | 4.36 |
| Flame Retardant 1 (FR 1) | 12.5 | | | 10.5 | 10.5 | 10.5 | 12.5 | 10.5 | 10.5 | 10.5 | 10.5 | 10.5 |
| Flame Retardant 2 (FR 2) | | 11 | | | | | | | | | | |
| Flame Retardant 3 (FR 3) | | | 10.5 | | | | | | | | | |

TABLE 2-continued

| Properties | | | | | | | | | | | | |
|---|---|---|---|---|---|---|---|---|---|---|---|---|
| MFR@260 C. 2.16 Kg g/10 min | 15.1 | 12 | 13.3 | 20.4 | 20.8 | 21.5 | 21.2 | 22.7 | 23.3 | 10.8 | 11.1 | 11.1 |
| HDT@0.45 Mp-3.2 mm | 98 | 100 | 91 | 99 | 98.9 | 99 | 98 | 98.1 | 98.7 | 102 | 102 | 102 |
| Vicat Soften Temp B/120 | 104 | 109 | 101 | 108 | 108 | 108 | 108 | 108 | 108 | 110 | 110 | 110 |
| INI@ 23 C. (J/m) | 91 | 642 | 587 | 575 | 598 | 631 | 620 | 641 | 604 | 804 | 829 | 838 |
| INI@10 C. (J/m) | NA | 590 | 110 | 444 | 498 | 531 | 546 | 564 | 498 | NA | NA | NA |
| INI@ 0 C. (J/m) | 86 | 311 | 98 | 97.3 | 95.3 | 107 | 189 | 140 | 129 | 614 | 651 | 680 |
| INI@ −10 C. (J/m) | 80.5 | 115 | 93 | | | | | | | 110 | 359 | 582 |
| FOT-5 parts, s 23 C.-48 hours | 50 | 56.0 | 32 | 31.4 | 27.1 | 36.3 | 31 | 70.2 | 70.2 | 27.4 | 29.4 | 33.7 |
| FOT-5 parts, s 70 C.-168 hours | 25.3 | 31.0 | 18.3 | 25.9 | 25.1 | 26.9 | 27.5 | 29.3 | 45.4 | 15.4 | 16.7 | 17.0 |

Note:
[a]Rubber content was calculated based on the recognition: EXL-PC contains ~20% silicone-based rubber, IM 1(MBS), IM 2(HRG), IM 3(SBS block copolymer) and IM4 (Metablen S-2001) contain 78%, 58.5%, 69% and 78% polybutadiene (or Silicone/Acrylic) rubber, respectively.
[b]NV denotes non vertical rating available due to the issues of long burning time, or burn to clamp or flame driping.

TABLE 3

| | E10 | E11 | E12 | E13 | E14 | E15 | E16 | E17 | E18 | E19 | E20 | E21 | E22 |
|---|---|---|---|---|---|---|---|---|---|---|---|---|---|
| Component | | | | | | | | | | | | | |
| PC 1 | 36.02 | 37.47 | 38.20 | 38.92 | | | | | | | | | |
| PC 2 | 36.02 | 37.47 | 38.20 | 38.92 | 67.20 | 68.17 | 69.14 | 70.09 | 72.01 | 73.94 | 67.45 | 68.69 | 69.92 |
| EXL-PC | 14 | 10.1 | 8.15 | 6.2 | 20.34 | 18.88 | 17.4 | 15.95 | 13.03 | 10.1 | 20.08 | 18.35 | 16.63 |
| Impact Modifier 1 (IM 1) | 2 | 3 | 3.5 | 4 | | | | | | | | | |
| Impact Modifier 2 (IM 2) | | | | | 0.5 | 1 | 1.5 | 2 | 3 | 4 | | | |
| Impact Modifier 3 (IM 3) | | | | | | | | | | | 0.5 | 1 | 1.5 |
| Impact Modifier 4 (IM 4) | | | | | | | | | | | | | |
| Total Rubber content*, % | 4.36 | 4.36 | 4.36 | 4.36 | 4.36 | 4.36 | 4.36 | 4.36 | 4.36 | 4.36 | 4.36 | 4.36 | 4.36 |
| Flame Retardant 1 (FR 1) | 10.5 | 10.5 | 10.5 | 10.5 | 10.5 | 10.5 | 10.5 | 10.5 | 10.5 | 10.5 | 10.5 | 10.5 | 10.5 |
| Properties | | | | | | | | | | | | | |
| MFR@260 C. 2.16 Kg g/10 min | 10.9 | 11.1 | 11.2 | 11.4 | 19.7 | 20.4 | 20.1 | 20.6 | 22 | 20.9 | 19.2 | 19.7 | 20.7 |
| HDT@0.45 Mp-3.2 mm | 101 | 101 | 101 | 101 | 98.9 | 98.9 | 99 | 98.9 | 98.8 | 98.9 | 99.3 | 99.3 | 99.2 |
| Vicat Soften Temp B/120 | 110 | 110 | 110 | 110 | 109 | 108 | 108 | 108 | 108 | 108 | 108 | 108 | 108 |
| INI@ 23 C. (J/m) | 860 | 812 | 783 | 767 | 622 | 637 | 670 | 686 | 690 | 690 | 630 | 660 | 654 |
| INI@10 C. (J/m) | NA | NA | NA | NA | 317 | 575 | 593 | 588 | 619 | 612 | 103 | 115 | 116 |
| INI@ 0 C. (J/m) | 703 | 695 | 651 | 664 | 97 | 109 | 129 | 270 | 546 | 556 | 93.5 | 106 | 107 |
| INI@ −10 C. (J/m) | 624 | 623 | 595 | 579 | | | | | | | | | |
| UL 94 Rating (0.6 mm) | V0 | NV | NV | NV | V0 | V0 | V0 | V0 | NV | NV | V0 | V0 | V0 |
| FOT-5 parts, s 23 C.-48 hours | 40.9 | 58.6 | 74.6 | 59.5 | 30.7 | 31.5 | 33.5 | 31.7 | 53.5 | 57.4 | 27 | 34 | 37 |
| FOT-5 parts, s 70 C.-168 hours | 31 | 37.75 | 27.5 | 20.1 | 23.6 | 21.2 | 18.35 | 22.8 | 32.1 | 49.3 | 17.2 | 17.4 | 17.9 |

| | E23 | E24 | E25 | E26 | E27 | E28 | E29 | E30 | E31 |
|---|---|---|---|---|---|---|---|---|---|
| Component | | | | | | | | | |
| PC 1 | | | | | | | | | |
| PC 2 | 71.14 | 73.59 | 76.04 | 67.69 | 69.14 | 70.59 | 72.04 | 74.94 | 77.84 |
| EXL-PC | 14.9 | 11.45 | 8 | 19.85 | 17.9 | 15.95 | 14 | 10.1 | 6.2 |
| Impact Modifier 1 (IM 1) | | | | | | | | | |
| Impact Modifier 2 (IM 2) | | | | | | | | | |
| Impact Modifier 3 (IM 3) | 2 | 3 | 4 | | | | | | |
| Impact Modifier 4 (IM 4) | | | | 0.5 | 1 | 1.5 | 2 | 3 | 4 |
| Total Rubber content*, % | 4.36 | 4.36 | 4.36 | 4.36 | 4.36 | 4.36 | 4.36 | 4.36 | 4.36 |
| Flame Retardant 1 (FR 1) | 12.5 | 10.5 | 10.5 | 10.5 | 10.5 | 10.5 | 10.5 | 10.5 | 10.5 |

TABLE 3-continued

| Properties | | | | | | | | | |
|---|---|---|---|---|---|---|---|---|---|
| MFR@260 C. 2.16 Kg g/10 min | 20.6 | 18 | 24.7 | 19.3 | 19.9 | 21.8 | 21.7 | 22.7 | 23.2 |
| HDT@0.45 Mp-3.2 mm | 99.2 | 99.2 | 99.4 | 99 | 98.8 | 99.1 | 99.1 | 99 | 98.8 |
| Vicat Soften Temp B/120 | 108 | 108 | 107 | 108 | 107 | 108 | 107 | 107 | 107 |
| INI@ 23 C. (J/m) | 632 | 471 | 126 | 687 | 695 | 697 | 713 | 699 | 690 |
| INI@10 C. (J/m) | 116 | 119 | 106 | 575 | 493 | 615 | 637 | 609 | 352 |
| INI@ 0 C. (J/m) | 106 | 115 | 96.8 | 113 | 115 | 130 | 139 | 138 | 175 |
| INI@ −10 C. (J/m) | | | | | | | | | |
| UL 94 Rating (0.6 mm) | NV | NV | NV | V0 | V0 | V0 | V1 | NV | NV |
| FOT-5 parts, s 23 C.-48 hours | 45 | 180 | 253 | 36.3 | 34.5 | 39.8 | 54 | 99.85 | 115.2 |
| FOT-5 parts, s 70 C.-168 hours | 27.8 | 80 | 120 | 20.15 | 20.6 | 20.5 | 26.25 | 37.1 | 40.35 |

| | E32 | E33 | E34 | E35 | E36 | E37 | E38 | E39 | E40 | E41 | E42 | E43 | E44 | E45 |
|---|---|---|---|---|---|---|---|---|---|---|---|---|---|---|
| Components | | | | | | | | | | | | | | |
| PC 1 | 33.85 | 34.57 | 35.30 | 36.02 | 37.47 | 38.92 | 33.85 | 34.57 | 35.3 | 36.02 | 37.47 | 38.92 | 36.02 | 34.4 |
| PC 2 | 33.85 | 34.57 | 35.30 | 36.02 | 37.47 | 38.92 | 33.85 | 34.57 | 35.3 | 36.02 | 37.47 | 38.92 | 28.52 | 24.4 |
| High Heat PC | | | | | | | | | | | | | 7.5 | 13.2 |
| EXL-PC | 19.85 | 17.9 | 15.95 | 14 | 10.1 | 6.2 | 19.85 | 17.9 | 15.95 | 14 | 10.1 | 6.2 | 14 | 14 |
| Impact Modifier 1 (IM 1) | 0.5 | 1 | 1.5 | 2 | 3 | 4 | 0.5 | 1 | 1.5 | 2 | 3 | 4 | 2 | 2 |
| Total Rubber content*, % | 4.36 | 4.36 | 4.36 | 4.36 | 4.36 | 4.36 | 4.36 | 4.36 | 4.36 | 4.36 | 4.36 | 4.36 | 4.36 | 4.36 |
| Flame Retardant 1 (FR 1) | | | | | | | | | | | | | 10.5 | 10.5 |
| Flame Retardant 2 (FR 2) | 11 | 11 | 11 | 11 | 11 | 11 | | | | | | | | |
| Flame Retardant 3 (FR 3) | | | | | | | 10.5 | 10.5 | 10.5 | 10.5 | 10.5 | 10.5 | | |
| Properties | | | | | | | | | | | | | | |
| MFR@260 C., 2.16 Kg, g/10 min | 12.5 | 11.7 | 12 | 11.6 | 11.6 | 12.2 | 12.9 | 12.9 | 13.6 | 13.3 | 13.1 | 13.2 | 10.1 | 8.16 |
| HDT@0.45 Mp-3.2 mm | 99.5 | 100 | 100 | 100 | 99 | 100 | 91 | 91 | 91 | 92 | 91 | 90 | 104 | 106 |
| Vicat Soften Temp B/120 | 110 | 109 | 110 | 108 | 111 | 109 | 101 | 100 | 100 | 101 | 102 | 101 | 113 | 116 |
| INI@ 23 C. (J/m) | 721 | 784 | 787 | 807 | 782 | 760 | 586 | 669 | 657 | 700 | 704 | 726 | 765 | 705 |
| INI@10 C. (J/m) | 97 | 616 | 673 | 689 | 699 | 698 | 86 | 93 | 161 | 431 | 582 | 577 | NA | NA |
| INI@ 0 C. (J/m) | 88 | 96 | 112 | 209 | 544 | 578 | 83 | 88 | 86 | 95.3 | 114 | 124 | 603 | 537 |
| INI@ −10 C. (J/m) | 84 | 92 | 99 | 109 | 119 | 127 | NA | NA | NA | NA | NA | NA | 134 | 137 |
| UL 94 Rating, 0.6 mm | V0 | V0 | V0 | V0 | V0 | V1 | V0 | V0 | V0 | V0 | V0 | V0 | NV | V0 | V0 |
| FOT-5 parts, s 23 C.-48 hours | 28.3 | 23.4 | 31.0 | 31.3 | 34.2 | 34.8 | 20.6 | 20.5 | 20.6 | 23.5 | 24.2 | 36.1 | 32.5 | 22.5 |
| FOT-5 parts, s 70 C.-168 hours | 16.9 | 18.45 | 20.3 | 22.4 | 20.9 | 30.0 | 14.8 | 14.8 | 13.1 | 18.7 | 20.5 | 25.6 | 26.4 | 21.4 |

The samples were tested for various mechanical, thermal, and flame retardant properties using the testing standards shown in Table 4. In addition to the formulation components shown in Tables 2 and 3, each composition was also formulated with 0.08 weight % phosphite stabilizer (PS), 1.0 weight % anti dripping agent (TSAN) and 0.08 weight % antioxidant (AO). Results of the testing are also shown for the respective compositions in Tables 2 and 3, respectively.

TABLE 4

| Property | Standard | Conditions | Specimen Type | Units |
|---|---|---|---|---|
| MFR | ASTM D1238 | 260° C./2.16 kg | Granule | g/10 mins |
| Notched Izod | ASTM D-256 | 23° C., 3.2 mm | Bar - 63.5 × 12.7 × 3.2 mm | J/m |
| Notched Izod | ASTM D-256 | 10° C., 3.2 mm | Bar - 63.5 × 12.7 × 3.2 mm | J/m |
| Notched Izod | ASTM D-256 | 0° C., 3.2 mm | Bar - 63.5 × 12.7 × 3.2 mm | J/m |
| Notched Izod | ASTM D-256 | -10° C., 3.2 mm | Bar - 63.5 × 12.7 × 3 2 mm | J/m |
| HDT | ASTM 648 | 0.45 MPa/3.2 mm | Bar - 127 × 12.7 × 3.2 mm | ° C. |
| Vicat | ASTM 1525 | 50 N - 120° C./hour | Bar - 127 × 12.7 × 3 2 mm | ° C. |
| UL | UL 94 | 0.60 mm thickness | Bar - 127 × 12.7 × 0.60 mm | V0, V1, V2 |

It can be seen from the data in Tables 2 and 3 that since EXL resin is alone used as impact modifier in the composition of C1 to C5, the composition all obtain a flammability rating of V0, but high impact was not included in property profile at temperature 10° C. for low viscosity composition C1 (MFR at ~20 g/10 min) and at temperature 0° C. for high viscosity composition C2 to C5 (MFR at ~11 g/10 min) in terms of notched izod impact (NII>=400 J/m). In Comparative Examples C6-C15, where impact modifiers, IM1 (MBS), IM2 (HRG), IM3 (SBS) and IM4 (S2001), are used as the sole impact modifier separately, IM1, IM2 and IM4 all show higher efficiency in terms of impact strength per unit amount of rubber, particularly at temperature 0° C. and -10° C., while IM3 (SBS) show the contrary result. However, all these compositions including high viscosity composition (C12 to C15) still present brittle behaviors at temperature 0° C. Note that though there is an exceptional composition C11, which retained high impact in terms of notched izod impact (NII>=500 J/m), it like the other failed to include in property profile the desired V0 flammability rating at 0.6 mm, primarily due to 'burn to clamp issue' and/or 'dripping issue' upon flame application. In particular, C13 provides an example comprising a higher %.wt composition of flame retardants. The additional flame retardant added into composition is able to markedly reduce total 'flame out time' during vertical flame test but can't improve flammability rating of composition. Moreover, C13 exhibits a marked reduction in both material heat distortion temperature and impact strength.

In contrast, when all these impact modifiers are separately used in combination with EXL resin, as seen in the compositions of Example E1-E43, all the compositions including the one based on IM4 (SBS) attained a significantly improvement of impact strength at all temperature (-10° C., 0° C. and 23° C.) in comparison with Comparative Example C1 to C15, even when the compositions are all of the same total amount of rubber at 4.63% and of the same viscosity level. This data suggests that combinational use of EXL resin and rubber-based impact modifier shows the highest rubber efficiency in terms of impact strength per unit amount of rubber, likely due to the synergistic effect among them. Moreover, compositions comprising less than 2% or 3% impact modifier achieved the desired V0 flammability rating at 0.60 mm, while other properties like heat distortion temperature and mold flow-ability are substantially unchanged.

Further, as exemplified by examples E44 and E45, heat resistance of such a composition can be further boosted by replacing general polycarbonate with high heat polycarbonate copolymer, while no marked impairment is made to the desired property balance of impact resistance and flame resistance.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polycarbonate composition comprising:
   (a) from 20 to 80 weight percent of a first polycarbonate component;
   (b) from greater than 0 to 25 weight percent of a polysiloxane-polycarbonate block copolymer comprising a polycarbonate block derived from bisphenol A and a diorganopolysiloxane block of the general formula (I):

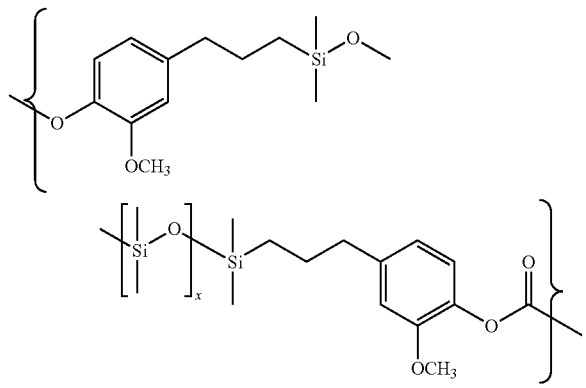

wherein "x" is an integer from 40 to 60 and wherein the organopolysiloxane block is randomly distributed in a Bisphenol-A polycarbonate block copolymer such that the siloxane content within the polysiloxane-polycarbonate block copolymer is about 20% and the weight average molecular weight of the polysiloxane-polycarbonate block copolymer is from 29,000 to 31,000 daltons using Bisphenol-A polycarbonate absolute molecular weight standards;
   (c) from greater than 0 to 5 weight percent of an impact modifier;
   (d) from greater than 0 to 5 weight percent of an anti-dripping agent;
   (e) from greater than 0 to 25 weight percent of a flame retardant;
   (f) from greater than 0 to 30 weight percent of a high heat polycarbonate component comprising 2-Phenyl-3,3-bis (4-hydroxyphenyl)phthalimidine (PPPBP); and
   (g) balance of one or more additional polymer composition additives;

wherein the polycarbonate composition exhibits a notched Izod impact strength greater than 400 J/m as measured according to American Society for Testing and Materials (ASTM) D256 as measured on a bar having a thickness of about 3.2 mm and wherein the composition exhibits a UL-94 flammability rating of V0 as measured on a flame bar having a thickness of about 0.60 mm.

2. The polycarbonate composition of claim 1, wherein the flame retardant comprises bisphenol A diphenylphosphate.

3. The polycarbonate composition of claim 1, wherein the impact modifier comprises a methyl methacrylate-butadiene-styrene (MBS) impact modifier.

4. The polycarbonate composition of claim 1, wherein the composition comprises less than 1000 ppm of a bromine and/or chlorine containing compound.

5. The polycarbonate composition of claim 1, wherein the first polycarbonate component comprises a blend of two or more polycarbonate polymers.

6. The polycarbonate composition of claim 1, further comprising from greater than 0 to 5 weight percent of a fluorinated polyolefin anti-dripping agent.

7. A polycarbonate composition comprising:
(a) from 20 to 80 weight percent of a first polycarbonate component;
(b) from 10 to 25 weight percent of a polysiloxane-polycarbonate block copolymer comprising a polycarbonate block derived from Bisphenol-A and diorganopolysiloxane block of the general formula (I):

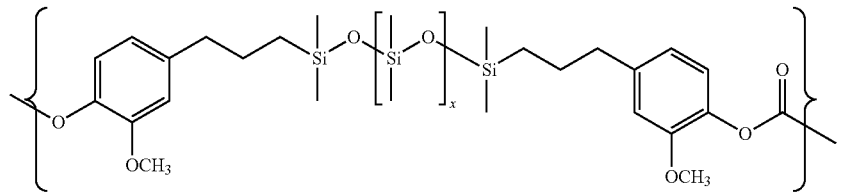

where in "x" is an integer from 40 to 60 and wherein the organopolysiloxane block is randomly distributed in a Bisphenol-A polycarbonate block copolymer such that the siloxane content within the polysiloxane-polycarbonate block copolymer is about 20% and the weight average molecular weight of the polysiloxane-polycarbonate block copolymer is from 29,000 to 31,000 daltons using Bisphenol-A polycarbonate absolute molecular weight standards;
(c) from greater than 0 to 5 weight percent of a methyl methacrylate-butadiene-styrene (MBS) impact modifier;

(d) from greater than 0 to 25 weight percent of a bisphenol A diphenylphosphate flame retardant;
(e) from greater than 0 to 5 weight percent of an anti-dripping agent;
(f) from greater than 0 to 15 weight percent of a high heat polycarbonate component comprising 2-Phenyl-3,3-bis (4-hydroxyphenyl)phthalimidine (PPPBP), and
(g) balance of one or more additional polymer composition additives;
wherein the composition exhibits a notched Izod impact strength greater than 400 J/m as measured according to American Society for Testing and Materials (ASTM) D256 as measured on a bar having a thickness of 3.2 mm and wherein the composition exhibits a UL-94 flammability rating of V0 as measured on a flame bar having a thickness of 0.60 mm.

8. The polycarbonate composition of claim 7, wherein the composition comprises less than 1000 ppm of a bromine and/or chlorine containing compound.

9. The polycarbonate composition of claim 7, wherein the first polycarbonate component comprises a blend of two or more polycarbonate polymers.

10. The polycarbonate composition of claim 7, further comprising from greater than 0 to 5 weight percent of a fluorinated polyolefin anti-dripping agent.

11. A method for the manufacture of a polycarbonate composition that exhibits a notched Izod impact strength greater than 400 J/m as measured according to American Society for Testing and Materials (ASTM) D256 as measured on a bar having a thickness of 3.2 mm and wherein the composition exhibits a UL-94 flammability rating of V0 as measured on a flame bar having a thickness of 0.60 mm, wherein the method comprises combining
(a) a first polycarbonate component, wherein the first polycarbonate component is combined in an amount of from about 20 to 80 weight percent of the composition;
(b) a polysiloxane-polycarbonate block copolymer comprising a polycarbonate block derived from bisphenol A and a diorganopolysiloxane block of the general formula (I):

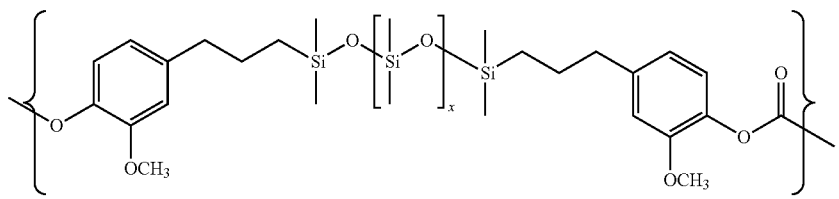

wherein "x" is an integer from 40 to 60, wherein the organopolysiloxane block is randomly distributed in a Bisphenol-A polycarbonate block copolymer such that the siloxane content within the polysiloxane-polycarbonate block copolymer is about 20% and the weight average molecular weight of the polysiloxane-polycarbonate block copolymer is from 29,000 to 31,000 daltons using Bisphenol-A polycarbonate absolute molecular weight standards, and wherein the polysiloxane-polycarbonate block copolymer is combined in an amount from greater than 0 to 25 weight percent of the composition;

(c) an impact modifier, wherein the impact modifier is combined in an amount of from greater than 0 to 5 weight percent of the composition;

(d) an anti-dripping agent, wherein the anti-dripping agent is combined in an amount from greater than 0 to 5 weight percent of the composition;

(e) a flame retardant, wherein the flame retardant is combined in an amount from greater than 0 to 25 weight percent of the composition;

(f) a high heat polycarbonate component comprising 2-Phenyl-3,3-bis(4-hydroxyphenyl)phthalimidine (PPPBP), wherein the high heat polycarbonate component is combined in an amount from greater than 0 to 30 weight percent of the composition; and (g) a balance amount of one or more additional polymer composition additives.

12. The method of claim 11, wherein the flame retardant comprises bisphenol A diphenylphosphate.

13. The method of claim 11, wherein the impact modifier comprises a methyl methacrylate-butadiene-styrene (MBS) impact modifier.

14. The method of claim 11, wherein the composition comprises less than 1000 ppm of a bromine and/or chlorine containing compound.

15. The method of claim 11, wherein the first polycarbonate component comprises a blend of two or more polycarbonate polymers.

16. The method of claim 11, wherein the anti-dripping agent comprises a fluorinated polyolefin anti-dripping agent.

17. A method for the manufacture of a polycarbonate composition that exhibits a notched Izod impact strength greater than 400 J/m as measured according to American Society for Testing and Materials (ASTM) D256 as measured on a bar having a thickness of 3.2 mm and wherein the composition exhibits a UL-94 flammability rating of V0 as measured on a flame bar having a thickness of 0.60 mm, wherein the method comprises combining (a) a first polycarbonate component, wherein the first polycarbonate component is combined in an amount of from about 20 to 80 weight percent of the composition;

(b) a polysiloxane-polycarbonate block copolymer comprising a polycarbonate block derived from bisphenol A and a diorganopolysiloxane block of the general formula (I):

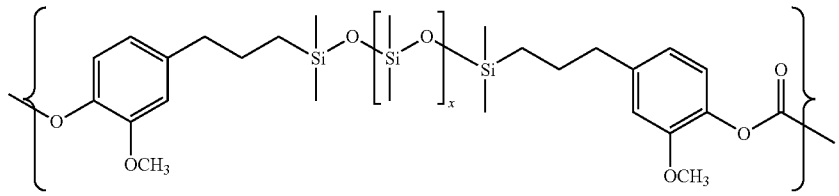

where in "x" is an integer from 40 to 60, wherein the organopolysiloxane block is randomly distributed in a Bisphenol-A polycarbonate block copolymer such that the siloxane content within the polysiloxane-polycarbonate block copolymer is about 20% and the weight average molecular weight of the polysiloxane-polycarbonate block copolymer is from 29,000 to 31,000 daltons using Bisphenol-A polycarbonate absolute molecular weight standards, and wherein the polysiloxane-polycarbonate block copolymer is combined in an amount from greater than 0 to 25 weight percent of the composition;

(c) a methyl methacrylate-butadiene-styrene (MBS) impact modifier impact modifier, wherein the impact modifier is combined in an amount of from greater than 0 to 5 weight percent of the composition;

(d) an anti-dripping agent, wherein the anti-dripping agent is combined in an amount from greater than 0 to 5 weight percent of the composition;

(e) a bisphenol A diphenylphosphate flame retardant, wherein the flame retardant is combined in an amount from greater than 0 to 25 weight percent of the composition;

(f) a high heat polycarbonate component comprising 2-Phenyl-3,3-bis(4-hydroxyphenyl)phthalimidine (PPPBP), wherein the high heat polycarbonate component is combined in an amount from greater than 0 to 15 weight percent of the composition, and (g) a balance amount of one or more additional polymer composition additives.

18. The method of claim 17, wherein the composition comprises less than 1000 ppm of a bromine and/or chlorine containing compound.

19. The method of claim 17, wherein the first polycarbonate component comprises a blend of two or more polycarbonate polymers.

20. The method of claim 17, wherein the anti-dripping agent comprises a fluorinated polyolefin anti-dripping agent.

21. An article of manufacture comprising the polycarbonate composition of claim 1.

22. An article of manufacture comprising the polycarbonate composition of claim 7.

* * * * *